US006226891B1

(12) United States Patent
Chapman

(10) Patent No.: US 6,226,891 B1
(45) Date of Patent: May 8, 2001

(54) METHOD AND APPARATUS FOR DRYING IRON ORE PELLETS

(76) Inventor: Daniel R. Chapman, 2003 Bowie La., Corinth, TX (US) 76205

( * ) Notice: Subject to any disclaimer, the term of this patent is extended or adjusted under 35 U.S.C. 154(b) by 0 days.

(21) Appl. No.: 09/613,490

(22) Filed: Jul. 11, 2000

Related U.S. Application Data

(63) Continuation-in-part of application No. 09/455,384, filed on Dec. 6, 1999, now Pat. No. 6,148,543.

(51) Int. Cl.$^7$ .................................................... F26B 7/00
(52) U.S. Cl. ................................. 34/508; 34/210; 34/230
(58) Field of Search ............................. 34/423, 424, 507, 34/508, 509, 510, 201, 210, 218, 230; 432/130, 144, 152; 110/221, 224, 268, 269, 270, 328

(56) References Cited

U.S. PATENT DOCUMENTS

| 2,671,968 | | 3/1954 | Criner . | |
|---|---|---|---|---|
| 3,868,245 | * | 2/1975 | Fischer | 504/131 |
| 3,868,246 | | 2/1975 | Boss . | |
| 3,893,233 | | 7/1975 | Malcolm . | |
| 4,635,379 | * | 1/1987 | Kroneld | 34/413 |
| 4,722,750 | * | 2/1988 | Saito et al. | 75/759 |
| 5,191,724 | * | 3/1993 | Fontanille | 34/60 |
| 5,989,371 | * | 11/1999 | Nishimoto | 156/73.6 |

OTHER PUBLICATIONS

Haas L.A. and K.W. Olson. Effects of Magnetite Oxidation on the Properties of Taconite Pellets. Paper in Proceedings of 64th Annual AIME Meeting (Duluth, MN, Jan. 16–17, 1991) SMME(AIME), 1991, pp377–394.

Haas L.A. et al. Use of Oxygen–Enriched Gas for the Oxidation of Acid and Fluxed Taconite Pellets. BuMines RI 9473, 1993, 15 pp.

Meyer K. Pelletizing of Iron Ores. Springer–Verlag Press, Berlin, Germany, 1980, pp24–37.

Meyer K.J.E. and H. Rausch. The Lurgi Pelletizing Process: A Combined Updraft–Downdraft Technique. J. of Metals, V.10, 1958, pp129–133.

* cited by examiner

*Primary Examiner*—Pamela Wilson
(74) *Attorney, Agent, or Firm*—James V. Harmon

(57) ABSTRACT

In the present method of drying iron ore pellets, e.g., magnetite pellets, moisture-containing iron ore pellets are formed into a bed comprising a multiplicity of the pellets. A current of drying gas is forced upwardly through the bed of pellets to at least partially dry some of the pellets. Radiant heat reflectors above the bed reflect heat back onto the pellets with air jets simultaneously directing air downwardly onto the top surface of the bed. Air is forced between the reflectors are placed and onto the bed to, especially below the firebrick wall between the end of the updraft drying zone and the downdraft drying zone. Water is applied to the hot pellets to produce steam as well as water vapor which is added to a current of air to produce a stream of hot, humid air that is passed through the bed to improve pellet characteristics and recover waste heat. Air supplied at a selected point is cut off responsive to the presence of a blow hole in the bed so as to improve drying efficiency and improve uniformity of drying.

27 Claims, 13 Drawing Sheets

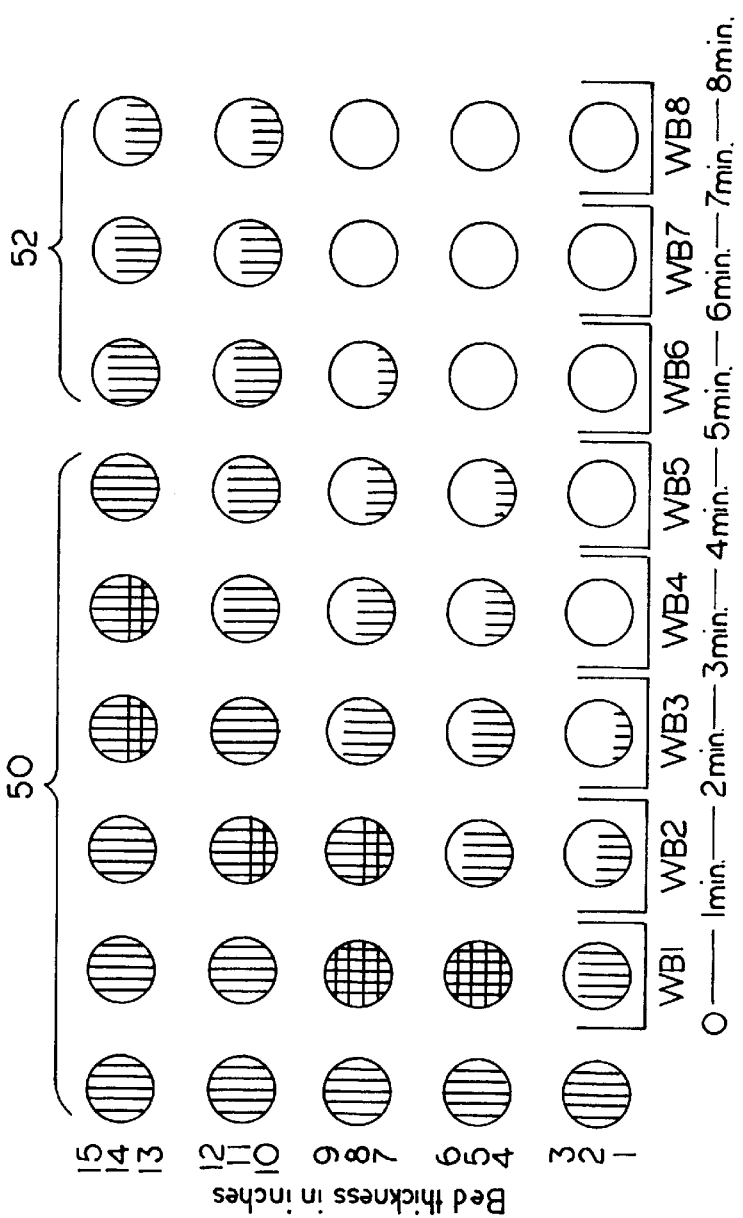
FIG. 7
MOISTURE CONTENT OF PELLETS WITHOUT DOWNDRAFT JETS
KEY FOR FIGURES 7 AND 8
 Condensed water added >11%
 10-11% water
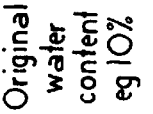 Original water content eg 10%
 <10% water
○ <6% water

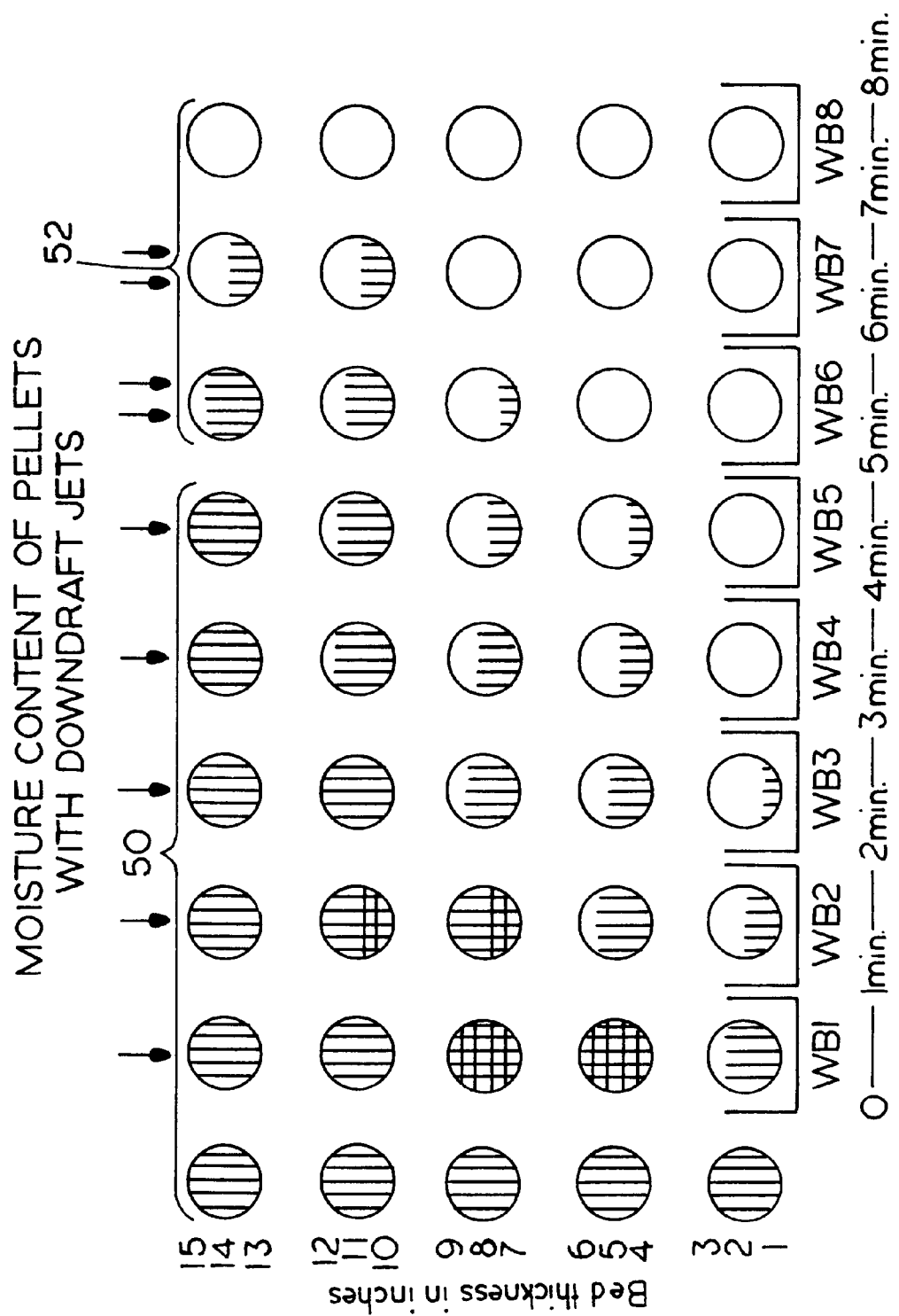

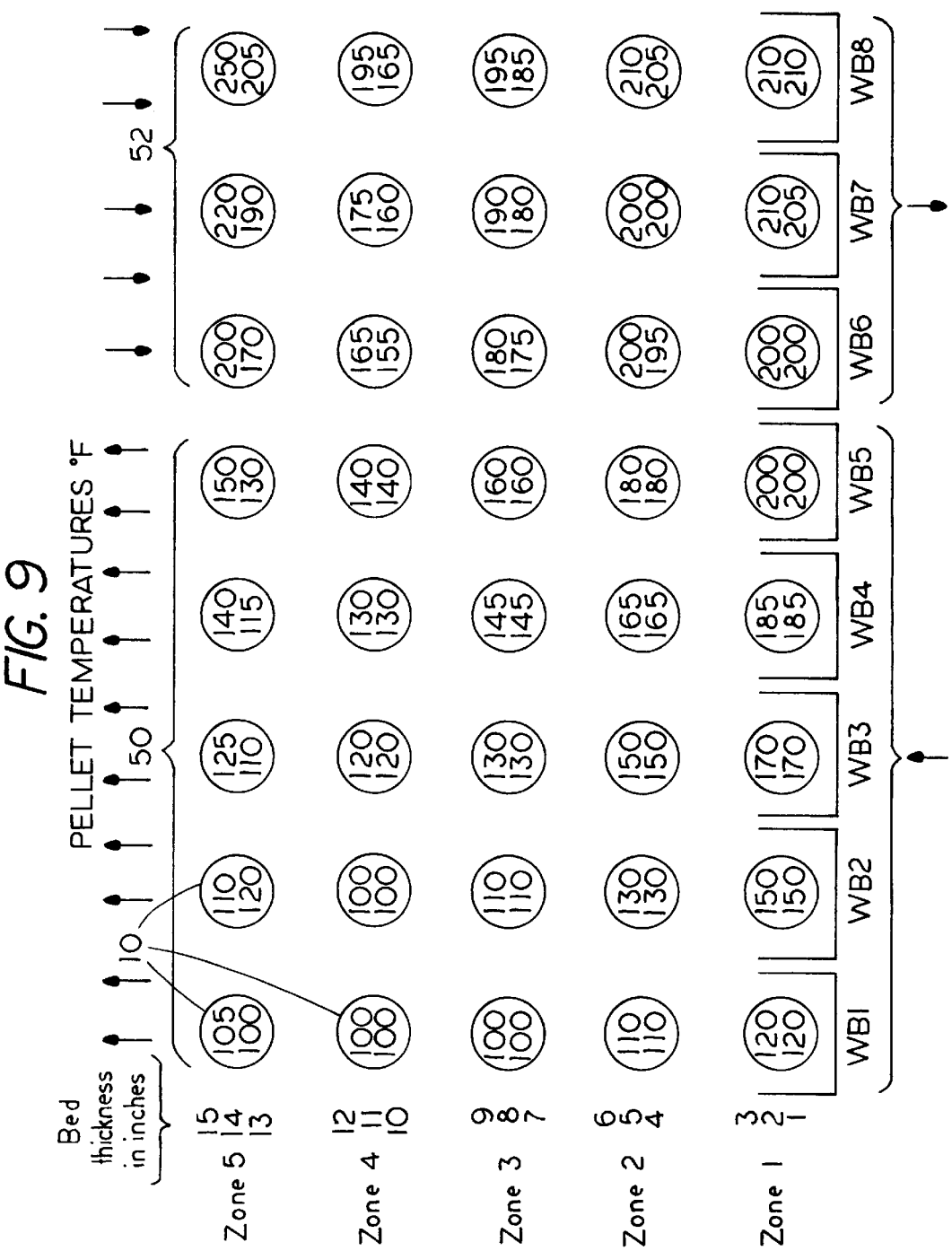

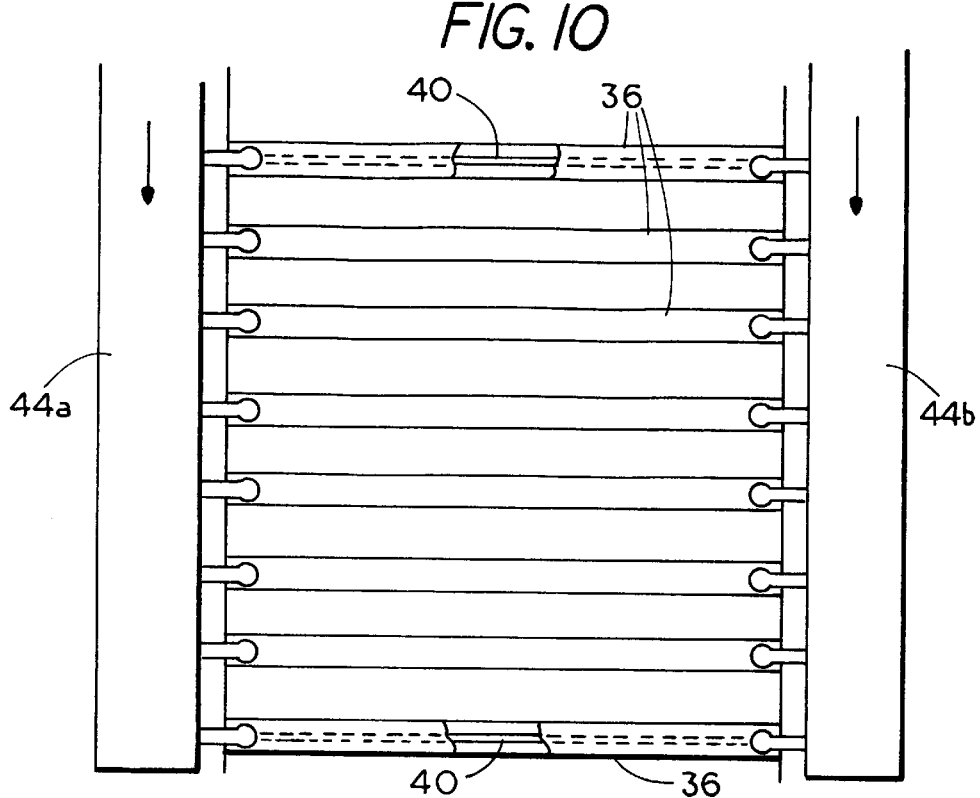
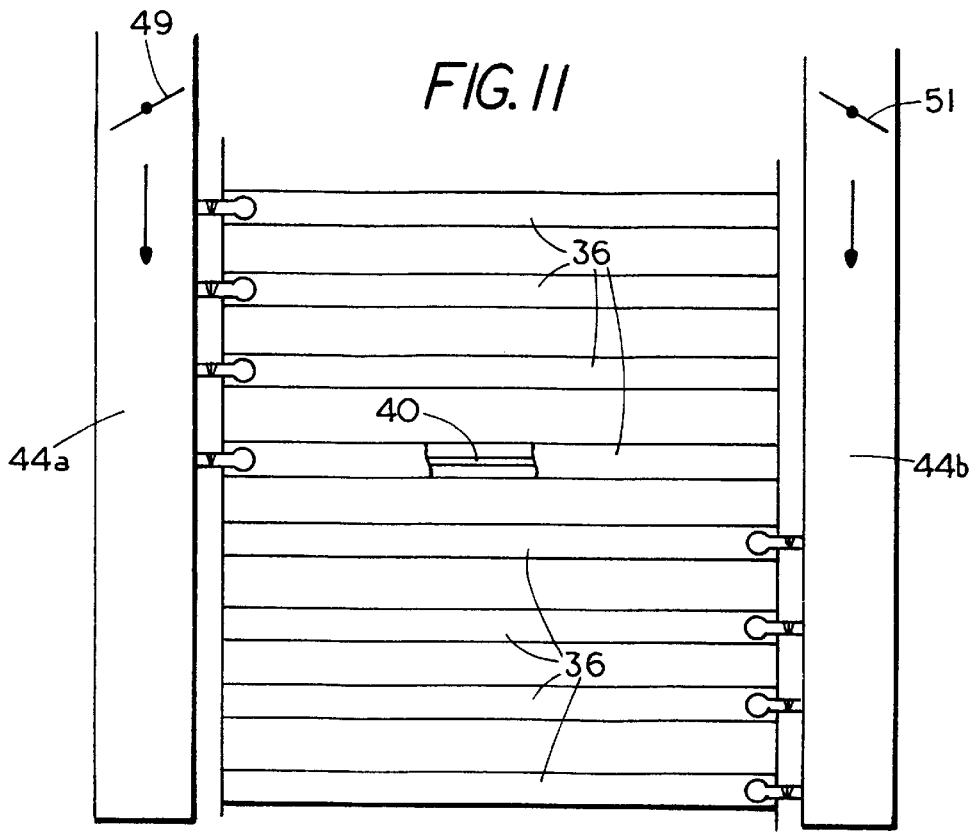

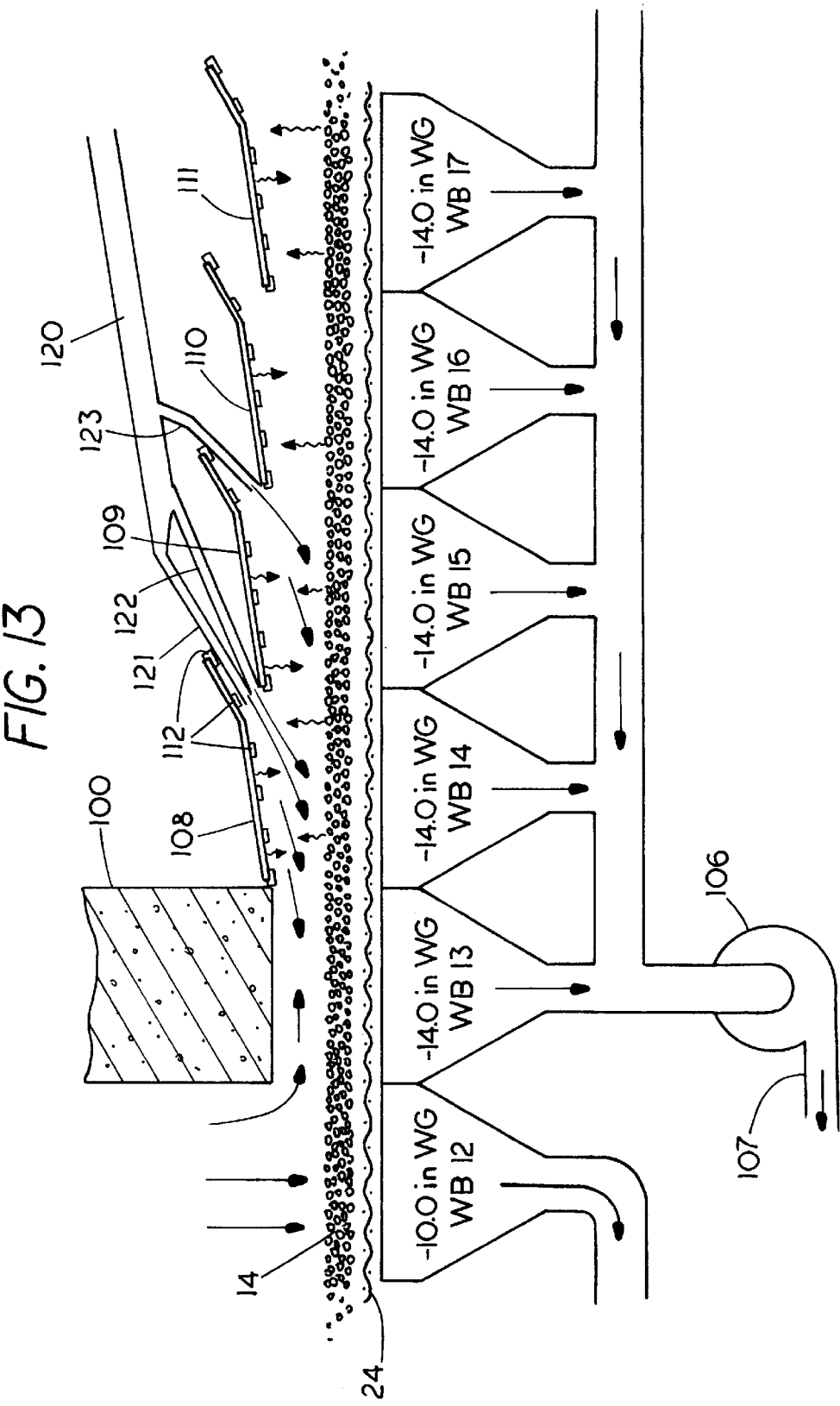

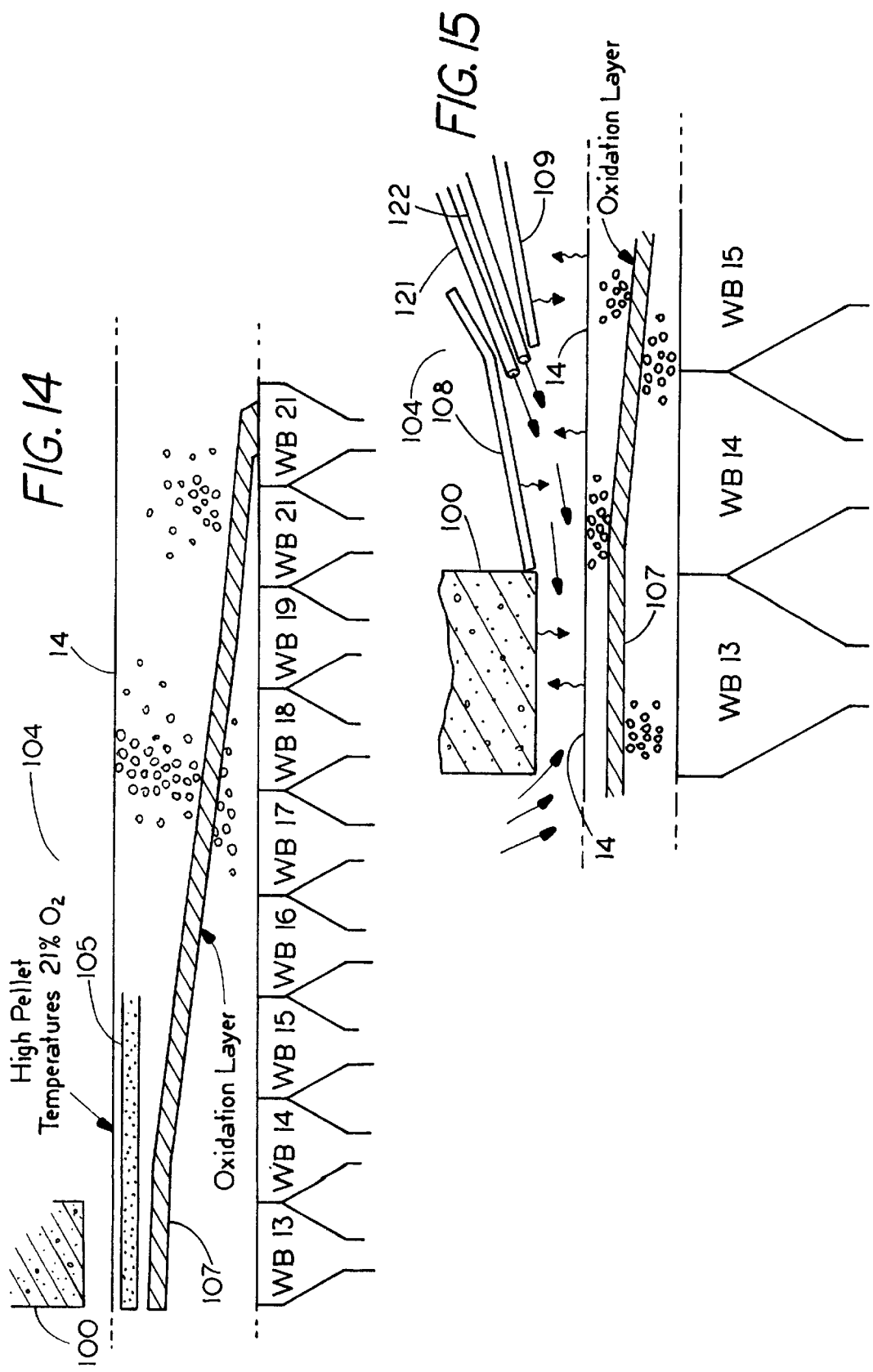

METHOD AND APPARATUS FOR DRYING IRON ORE PELLETS

This application is a continuation-in-part of Ser. No. 09/455,384 filed Dec. 6, 1999 U.S. Pat. No. 6,148,543.

FIELD OF THE INVENTION

This invention relates to drying processes, and more particularly to a method and apparatus for drying iron ore pellets.

BACKGROUND OF THE INVENTION

Several processes have been in use over the years for drying green, i.e., moist, iron ore pellets, e.g., hematite, magnetite or limonite. The objective of these processes is to remove residual moisture so as to produce a strong fired pellet having maximum abrasion and breakage resistance as adjudged by crushing tests, optimum porosity and, where stored in cooler climates, good resistance to repeated freezing and thawing. In treating certain ores the process should also provide optimal oxygenation, since poor strength may otherwise result in the case of magnetite pellets where oxidation to $Fe_2O_3$ is not complete, leaving magnetite cores in the center of the pellets.

Prior methods employed in drying iron ore pellets will now be described briefly by way of example in connection with the drying of magnetite pellets obtained from taconite. It should be understood, however, that although the present invention is described in connection with a particular ore, it is not limited to specific apparatus or processes described.

For the last 45 years the beneficiation of magnetite-containing rock has consisted of crushing, grinding and milling the ore. The specific operation consists of separating the desired material from the gangue (waste) material through hydraulic separation, magnetic separation, and by chemically treating the ore to further enhance the separation of the ore from the waste rock.

The material separated from the waste material is called concentrate. The total iron may range from 65% to 69% or other economically practical value. The concentrate is generally described as a powder with the general size that can pass through a screen of a selected size. The screen usually used is a U.S. Standard Tyler Screen of 325 and 500 mesh to the inch. The 500 mesh screen has openings about 27 microns in diameter.

Some of the general size descriptions might be 85% minus 325 mesh and 75% minus 500 mesh as an example. The percentage values correspond to the amount of grinding necessary to liberate the desired product from the waste product. The grinding, milling and treatment of the ore generally occur in a section of the plant called the concentrator, hence the name concentrate.

The concentrate is generally piped in an aqueous slurry of 60% solids to a vacuum filter. The vacuum filter removes most of the water from the slurry. The resulting product is called a filter cake with generally less than 10% water. The amount of water is controlled by the efficiency of the filtering operation and also by the size of the particles in the concentrate. The concentrate (filter cake) is generally conveyed to storage bins before being fed into a disk or drum balling device.

The concentrates have additives to improve the balling, firing or chemical composition of the product once it has been fired. Some of the common additives are bentonite clay, limestone in the form of calcium hydroxide if fluxed pellets are produced, and sometimes an organic binder.

The balling of concentrate is accomplished in a process in which the material is rolled in stages that increase the size of the pellet by applying a layer of concentrate upon a smaller pellet until the pellet reaches the desired size. The product from a balling drum is screened to selectively size the product. The undersized material is circulated back into the balling drum. The circulated material is called seed pellets. The balling action applies the concentrate to minimize interstitial spaces, hence smaller particles are forced between larger particles. The mixture of particle sizes makes a pellet of maximum density. The additives also fill the interstitial spaces and often provide a pathway for the gradual removal of water from the inside of the pellet. Pathways are also provided for oxygen to enter the inside of the pellet during the firing of the pellet. Knowledge of the removal of water from the inside of pellets is necessary to appreciate the contributions that the present invention provides towards the firing of magnetite pellets. An adequate preliminary description of the equipment and the mineral beneficiation process has been provided. It is also necessary to describe the physical and chemical changes in each section of a pelletizing machine.

The prior drying process and some of the limitations of that system which negatively impact on the next stage of the pelletizing process (the firing of the pellets) will now be described. It should be noted, however, that even a detailed explanation of the physical changes of the product is an oversimplification of a complex process.

The finished pellets are screened and placed on conveyor pallets each having grate bars at its bottom that holds the pellets as they travel through the furnace. The pellets are placed gently on the pallet grate bars to form a level bed of pellets at a depth that has been established through practical experience. The depth is usually about 15 inches or more in thickness. Quite frequently, a layer of recently fired pellets is first placed upon the grate bars to form a layer of fired pellets about 3 inches thick. The fired pellet layer is called a hearth layer. Each pallet is part of an endless track conveyor about 300 feet long and often 8 to 12 feet wide. One common conveyor is called a traveling grate machine. The conveyor is part of and contained for the most part within the drying, firing magnetite conversion and cooling zones of a furnace.

There are zones or sections of the furnace named to describe the process that occurs in each zone of the furnace. Generally, the first zone of a travelling grate furnace is the updraft drying zone. The present invention is used in this section of the furnace, as well as the next zone called the downdraft drying zone (DDZ).

As an example, consider that a hearth layer of fired pellets 3 inches deep is placed upon the pallet grate bars. A layer of finished pellets 15 inches deep is then placed upon the hearth layer, making a total depth of 18 inches. The hearth layer is dry and the pellets in the finished pellet layer contain 10% water. The grate bars are aligned on the pallet to provide openings about ¼ inch wide to permit hot air to flow through the openings.

The updraft drying zone of the furnace consist of wind-boxes beneath the travelling grates. Each windbox is designed to provide a reasonably airtight seal to force air under pressure up through the bed of pellets that is on the travelling grate. A large quantity of air is directed up through both the hearth layer and the layer of finished pellets. The air temperature is generally 600° F. to 850° F. This description applies to a continuously travelling grate machine that is in equilibrium for temperature and airflow. As an example, consider an 8 ft. wide by 8 ft. long windbox. Assuming the grates travel 96 inches a minute, any pellets are above a windbox for one minute. Hot air is forced up through the pellet bed by a forced draft fan. Sufficient upward velocity and static pressure is maintained to establish an upward airflow. The hot air blowing by the finished pellets evaporates surface water while water inside the pellets slowly evaporates. Some of the heat energy warms the pellets, but most of the heat is used to evaporate water on and within the pellets. The heating and evaporation proceeds from the bottom up through the pellet bed. The transfer of heat travels slowly up through the pellet bed. The evaporation of water cools the air by an amount of energy called the heat of vaporization. The heat transferred to solid masses such as the pallet frames and the hearth layer is called sensible heat transfer.

It is necessary to understand some of these physical changes to evaluate the potential attributes of my invention. Moist air travelling up through a bed of cold pellets is eventually cooled to the dewpoint temperature so that water vapor condenses on the cool pellets, thereby increasing the water content of the pellets. Air travelling up through the pellet bed also carries moisture entirely through the pellet bed. The amount of water removed is consistent with the moisture carrying capacity of the air. The amount of water vapor present is the 100% relative humidity value for the temperature that the air leaves the pellet bed. Water vapor removed in this manner is the primary way that water is removed from the pellet bed. Some of the water evaporated from the lower half of the pellet bed is, however, merely transferred by the condensing action to the cooler pellets in the upper portion of the pellet bed. The pellets on the top of the pellet bed increase in water content by the condensing of water vapor upon their surface so that pellets that originally had less than 10%, now will contain over 12% water, mainly on the surface of each pellet.

The volume of water removed in the updraft drying zone (UDZ) of the furnace probably exceeds 40 gallons of water per minute. The water removed passes through the top of the pellet bed as water vapor. Forty gallons per minute corresponds to 50% of the water contained in pellets entering the drying zone at a rate of 200 tons per hour.

The cooler pellets near the top of the pellet bed are at the dewpoint temperature. These pellets help control and establish the dewpoint of the moist air travelling upward through the bed of pellets. Essentially the 40 gallons of water removed as water vapor came from the lower section of the pellet bed.

At the end of the UDZ, the pellets at the bottom of the pellet bed are at the temperature and water content correct for the next stage of the firing process prior to the actual firing process. However, in the sequence being described they will not be fired until the end of the firing sequence. At the end of the UDZ the pellets in the top 4 inches of the pellet bed still are wet (over 10% water) and these are the pellets that are to be fired in the final zone, the downdraft firing zone (DFZ) because the DFZ fires the top of the pellet bed first. Following the UDZ is the downdraft drying zone (DDZ) in which the air direction is down onto the pellet bed. The top pellets entering this zone are wet with a water content exceeding 10%. For a depth of 5 or 6 inches the pellets are wetter than when they were initially placed on the pallets. The thrust of air directed upon the pellet bed and the suction of the waste gas fan in the DDZ provide energy to draw air down through the bed of pellets. The pellets are in the downdraft drying zone of the furnace for only about 2 minutes.

Very little drying takes place in the DDZ of the furnace. This becomes clear when one considers how hard it is to suck air downwardly through 15 inches of pellets, especially when the top 6 inches are wet. Any water that is evaporated expands to steam and artificially increases the volume of gas travelling through the bed of pellets. This is an important factor upon which the present invention is based. The present invention will effectively minimize the problem caused by inadequate drying that occurs in both the updraft and downdraft drying zones of pelletizing furnaces.

Following the DDZ, the pellets enter the downdraft firing zone (DFZ) with no delay. The temperature in the DFZ is typically 1600° F. to 1800° F. A waste gas fan draws the heated air and combustion gasses through the pellet bed. Pellets that are wet to a depth of about 6 inches from the top of the bed with about 10% water are exposed to hot air (1800° F.) which flows downwardly through that mass of pellets.

The balling drum additives such as bentonite clay, organic binder, limestone or a similar basic oxide present in the pellets, provide pathways for water vapor to escape. The limestone is added when fluxed pellets are desired. While probably providing pathways for water vapor removal, it is likely that the limestone will maintain a higher moisture level than what would be present without the limestone. If adequate amounts of additives are not present to provide a pathway for steam to escape the pellets' interior, the pellets may explode and break off part of the outside of the pellet. This unfavorable characteristic is called spalling. With an adequate amount of additive present, however, the water in the pellet is escaping at the time that it would be desirable for oxygen to penetrate to the center of the pellet and begin the conversion of magnetite to hematite reaction. If complete conversion does not take place, a magnetite core results. magnetite cores can be caused by introducing pellets with too much water into the firing zone of the furnace. The outer layers of the pellets are often sealed through grain growth, thus eliminating the possibility of oxygen reaching the center of the pellet. This is another way that magnetite cores can be produced. The magnetite cores contribute to breakage problems in transportation or inhibit proper blast furnace conversion.

In view of these and other deficiencies, there exists an important need for an improved ore pellet drying process that is not subject to the aforementioned problems and shortcomings.

It is therefore one objective of the present invention to provide an improved ore drying process suited for drying pellets of magnetite, hematite, limonite or other ores in which the pellets have improved strength, abrasion and breakage resistance.

Another object of the invention is to provide fired pellets with the aforesaid advantages which also have optimum moisture content, porosity and resistance to repeated freezing and thawing when fired pellets are produced.

A further object of the invention is to provide an improved ore drying process for hematite, magnetite or limonite wherein a more uniform drying is accomplished throughout all portions of the bed of pellets being dried due to the elimination or reduction of a moisture gradient between the top and bottom surfaces of the pellet bed and to eliminate or reduce the presence of magnetite cores in fired magnetite pellets.

These and other more detailed and specific objects of the present invention will be better understood by reference to the following figures and detailed description which illustrate by way of example of but a few of the various forms of the invention within the scope of the appended claims.

SUMMARY OF THE INVENTION

In the present method of drying iron ore pellets, moisture-containing iron ore pellets are formed into a bed comprising a multiplicity of the pellets. A current of drying gas is forced upwardly through the bed of pellets to at least partially dry some of the pellets. One aspect of the invention concerns the use of at least one counter-current jet of a drying gas that is provided above the bed. The jet of drying gas is directed downwardly so as to impinge on the upper surface of the bed through which the current of gas rises. The bed of pellets is thus dried with the current of drying gas flowing through the bed from below as well as the jet of drying gas impinging on the upper surface of the bed. The term "jet" herein refers to a relatively high speed stream or sheet of gas that is restricted to a specific area. A preferred form of the invention includes a second stage in which a downwardly directed jet of drying gas is used together with a downward current of drying gas. The present invention also contemplates the possibility of reversing upward and downward flow directions so, for example, in the first stage the current of drying gas could flow downwardly with the counter-current jet being directed upwardly onto the lower surface of the bed. Thus the terms "up" or "down" or "upwardly" or "downwardly" herein indicate directions relative to one another rather than to the earth. Among the other aspects of the invention is a provision for the recovery of waste heat, the improvement of heat and moisture transfer within the pellet bed, and the reduction of losses due to the presence of blow holes in the pellet bed.

THE FIGURES

FIG. 7 is a diagram depicting the moisture content of the pellets without the downdraft jets of the present invention.

FIG. 8 is a diagram similar to FIG. 7 but depicting the moisture content of the pellets with the downdraft jets of the present invention.

FIG. 9 is a diagrammatic depiction of the temperature of the pellets with and without the invention at different levels in the bed.

FIG. 10 is a diagrammatic plan view partly in section showing how air is piped to the air jets in accordance with one form of the invention.

FIG. 11 is a view similar to FIG. 10 showing how air can be piped to the jets in accordance with another embodiment of the invention.

FIG. 13 is an enlarged diagrammatic sectional view in the area of windboxes 12–17.

FIG. 14 is a diagrammatic sectional view on a smaller scale of the region of windboxes 13–21.

FIG. 15 is a diagrammatic sectional view on a larger scale to show air flow above windboxes 13–15.

DETAILED DESCRIPTION OF THE INVENTION

Figure 1:
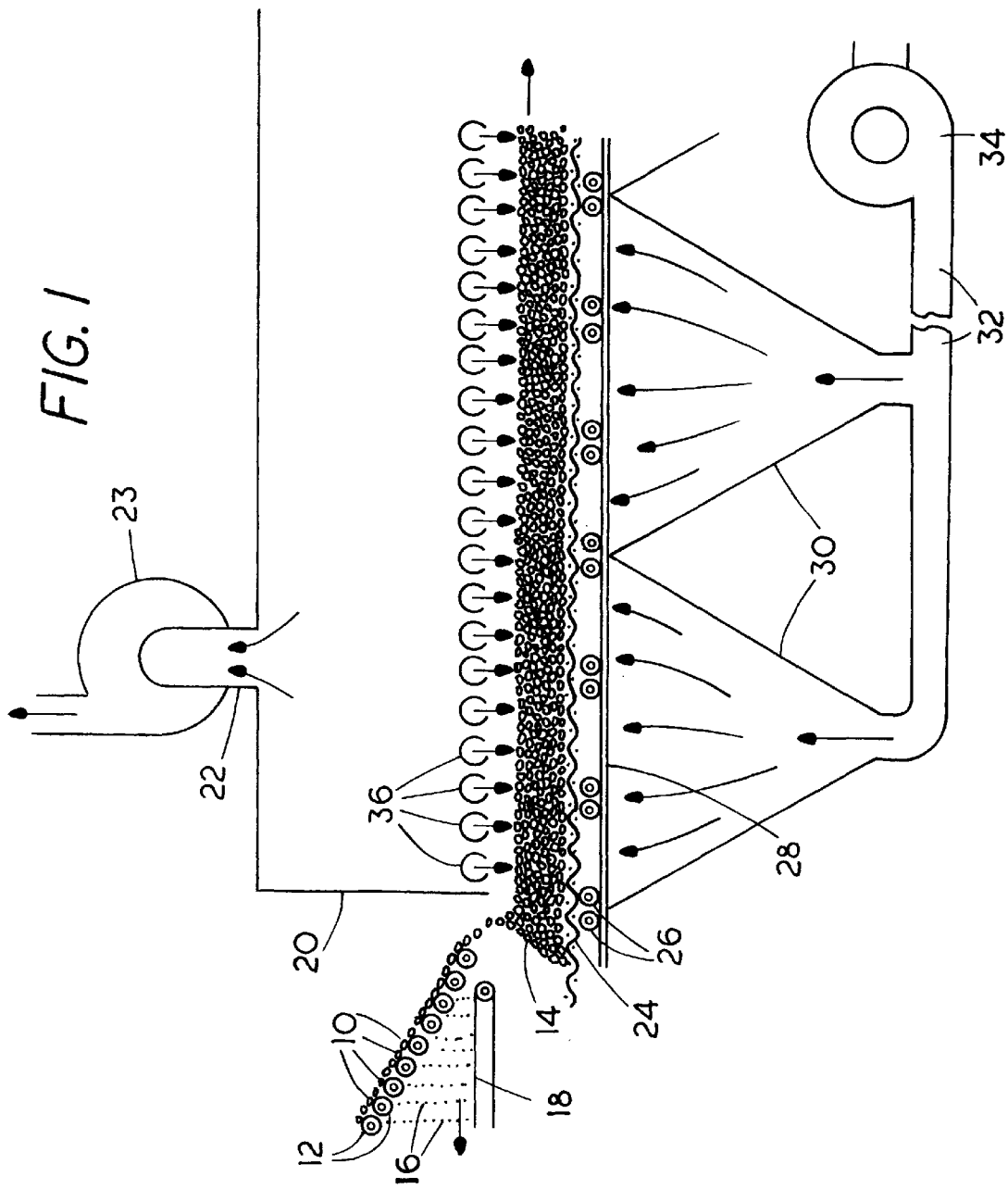
FIG. 1 is a diagrammatic vertical longitudinal sectional view of an apparatus embodying the present invention.

The present invention functions to improve drying at the top of the pellet bed by blowing at least one counter-current jet of hot air downwardly into the pellet bed. The downwardly directed jet impinging against the top of the pellet bed in the updraft drying zone (UDZ) of the furnace has a higher flow velocity than the upward current of air. The jet will thus overcome for an instant the upward movement of air in the air current, but because the upward movement of air is continuous, the downward jetting of air will not interfere with, i.e., stop, the upward movement of air. Each jet of air emerges from a slot typically about 3 inches above the pellet bed. The impingement of the air jet against the pellets has a very noticeable effect compared to the current of air that is drawn through a bed of pellets as will be understood by those skilled in the art. For one thing, it removes the boundary layer of gas at the surfaces of the pellets in the upper layers of the bed.

The following description focuses on the removal of water from the top portion of a pellet bed. The invention is described by way of example, beginning with the first phase of a standard travelling grate furnace in solving some problems that occur in the updraft drying zone (UDZ) of a pelletizing furnace. It will be assumed that the conveyorized furnace has 8-foot wide conveyor pallets and five windboxes 8 feet by 8 feet in the UDZ, for a total drying zone 40 feet long. The pellets are assumed to have a mean diameter of $3/8$ inch and a water content of 10%.

The jet action is provided by a series of slotted supply pipes or other type ducting installed across the top of the pellet bed. Above the first windbox, the supply pipes are spaced as close to each other as practical, e.g., three pipes per foot. Each pipe or duct has a $3/8$" to $1/2$41 wide slot or jet opening extending its entire length. Each slot is on the bottom to enable hot air to be directed downwardly onto the pellet bed. Each pipe is typically about 3 inches above the top of the pellet bed. The distance of the pipe or duct above the pellet bed should not interfere with the conveyor operation.

While the air jets can be directed vertically, in some cases the air is blown downwardly at a slight angle, either into or with the direction of travel of the conveyor in the traveling grate machine. The hot air should travel about 2.5 inches into the bed of pellets with significant force. At about 4 inches into the bed, the jet will have a reduced force or velocity.

At the 4 inch depth it is necessary to warm the surface of a given pellet only a few degrees warmer than it would be without the jet. Warming the surface of a pellet only a few degrees warmer than the upward current of air is, however, highly effective since this is all that is needed to prevent condensation. It should be understood that the upflow of air is controlled by the temperature of the pellets in the area that the air is passing through. However, conductive heat transfer also has a small warming effect on the pellets at the 4-inch depth.

The jet above windbox WB1 blows hot air down into the first 2 or 3 inches of the pellet bed. The pellets contacted by the hot air jet are then warmed well above the dewpoint temperature. The top pellets then begin to be dried, significantly drier as they become heated on the outside. Water evaporates from the outside and some evaporation begins on the inside of the pellet.

The warming and drying of the top pellets will continue through the entire updraft drying zone because the countercurrent jet will continue to penetrate into the pellet bed. The spacing between the jet supply pipes can be reduced so that they are spaced on about one foot centers or so for the rest of the 40 foot DDZ.

The pellets are warmed by the hot air jets, but cooling of the pellets also occurs when the relatively cool saturated air current flows by the pellets in an upward direction. The consequent cooling of the pellets does not cool them below the dewpoint temperature, but physical water transfer may cause some of the pellets near the bottom (say, the bottom 4-inch layer) to get wet sporadically.

It is assumed that the furnace has adequate hood exhaust fan capacity to handle a significant upward current of air. Each furnace must be evaluated to determine the volume of jetted air needed to dry the top of the pellet bed. Furnaces with lower excess air capacity will use smaller jets and their spacing will be increased. As described more filly below, proper design will permit one to use as much hot jetted air as required. A greater benefit will result from using more air. In a system with higher air volume, the top 2.5 inches of pellets may be dried to 5% water. In the less aggressive system, the pellets may be dried to about 7% water. In either case the pellets leaving the updraft drying zone of the furnace will be significantly drier than what presently exist without the downward jetting of hot air.

In equipment employing the present invention, the resistance to airflow will be reduced for updraft drying. The lower resistance will provide the possibility of increasing the general air current so as to achieve better drying for the pellets below the top 4 inches of the pellet bed. This extra drying will improve the furnace operation.

Better drying of the pellets in the top 4 inches of the pellet bed that is achieved with the present invention will make the final product better because the drier pellets will not have the course rough surface that is caused by being wet due to condensation on the pellets surface. The course rough surface is one of the leading causes of dust in the finished pellets.

The next zone of the furnace is the downdraft drying zone (DDZ). To improve drying in this zone of the furnace, a current of hot air is blown down into the top of the pellet bed. The slots for the jets are very close to the top of the pellet bed, e.g., 1.5 to 2 inches away. Energy to create the downward velocity of each jet is provided by the static pressure developed by a fan. The volume of air jetted down onto the top of the pellet bed is designed to balance the amount of air exhausted by the waste gas fan connected to the windboxes in the DDZ. The waste gas fan provides negative suction to assist in drawing the jetted air through the pellet bed. All the air is travelling from the top of the pellet bed and down to the bottom of the pellet bed. For this reason the volume of air that is jetted down onto the bed will be adjusted to slightly exceed the volume of air in the current entering the hood over the DDZ.

Most of the surface water was removed in the updraft drying zone of the furnace by using counter-current downward jetting of hot air. However, in the downdraft drying section of the furnace most of the benefit will be in heating the pellets in the top 4 inches of the pellet bed. The removal of water is achieved by raising the temperature of the top 4 inches significantly above the boiling temperature of water. Additionally, water of hydration is also removed at temperature above 212° F. Additional drying is accomplished on the pellets below the 4-inch depth because the air is hot when it first penetrates to that depth.

A plurality of narrow slots preferably provide the downwardly directed air jets. Some or all of the slots can direct airjets at a slight angle into the movement of the travelling grate machine, and some can be used to direct the air with the movement of the travelling grate machine. However most of the slots will direct the air jets vertically into the pellet bed. The slots are typically about one-quarter to three-eighths inch wide. The jet velocity is about 2000 feet per minute to 3000 feet per minute at a temperature of about 800° F. The slot width and air velocity can, however, be changed depending upon the design specifications encountered.

Prior to final installation of the jet supply pipes, the volume of air exhausted by the hood exhaust fan and the waste gas fan is measured. Airflow of specific ductwork should also be measured to engineer the proper air balance.

The benefit of drying the top of the pellet bed can be appreciated when it is recognized that the prior system in use introduced pellets into the firing zone of the furnace with a water content of nearly 10% for the top 4 inches of the pellet bed. When the invention is used in the first two drying zones, the top 4 inches of the pellet bed entering the downdraft firing zone will have a water content as low as 4% which results in a significant improvement in the quality of the pellets produced. Increased furnace capacity in tons per hour is another important benefit.

A firebrick wall a few feet thick usually separates the downdraft drying zone (DDZ) from the downdraft firing zone (DFZ). Hot air jets according to the present invention are also provided in the area below the brickwork. This additional jetting is directed into the travelling movement of the pallets, i.e., by directing the jets slightly upstream. This will dry the pellets slightly more before they enter the firing zone.

Refer now to the drawings which illustrate by way of example a preferred mode of practicing the present invention, for example in drying magnetite pellets.

As shown in FIG. 1, green, freshly-formed pellets 10 are carried downwardly from left to right on a roller feeder screen indicated diagrammatically at 12 to a drying bed 14 which is typically about 15–18 inches thick. Fines 16 fall from the feeder screen 12 onto a conveyor 18 and are carried back to the pelletizer for reprocessing. Positioned over the bed 14 is a drying hood 20 having an outlet duct 22 that is connected to an exhaust fan 23 for drawing gas upwardly as indicated by arrows. The bed 14 of pellets 10 is typically supported on an endless conveyor screen, e.g., a pallet-style conveyor 24 that is connected to supporting rollers 26 which ride on longitudinally extending rails 28 so as to carry the bed 14 from left to right in the figures at a slow rate, e.g, eight feet per minute. Below the bed 14 and communicating with the bed 14 through the supporting conveyor 24 are a plurality of transversely extending, longitudinally distributed windboxes 30 beginning with number 1 in FIG. 3 proceeding from left to right, to which drying air is supplied to a duct 32 which communicates with a blower 34 for forcing the air into the windboxes 30 so as to blow a current of heated drying air upwardly through windboxes 1–5, thence through the portion of the bed 14 above each successive windbox 30 to at least partially dry the pellets 10 in the bed 14. Moisture-containing drying air is removed from the hood 20 through the exhaust outlet 22. Such a furnace is referred to as a "traveling grate furnace." In such a furnace, iron ore pellets are distributed across the width of grate pallets which make up the conveyor 24. The trip through the dryer usually lasts about five minutes. Previous to the present invention, the top of the pellet bed 14 had about six inches of wet pellets.

Figure 2:
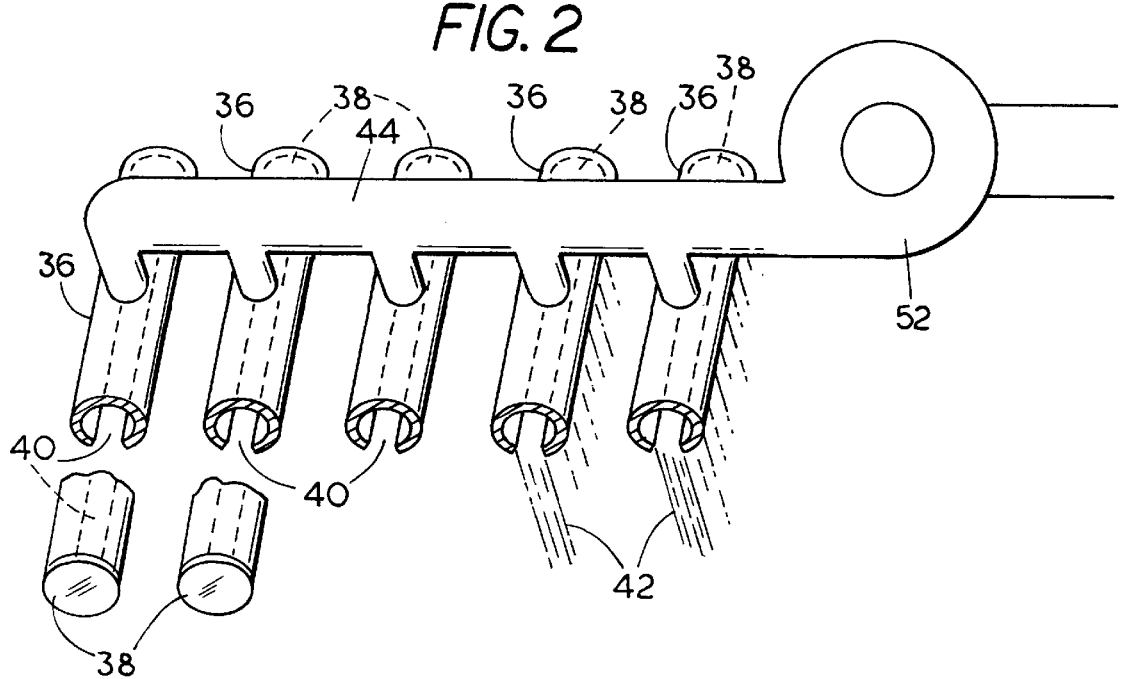
FIG. 2 is a diagrammatic perspective view showing pipes for providing counter-current drying gas jets in accordance with the present invention.

Refer now to FIG. 2. Positioned above the bed 14 and spaced apart from the bed a short distance, typically from about two to four inches, are a plurality of laterally extending, horizontally disposed drying gas supply pipes or ducts 36, each of which is closed on each end by means of end walls 38. Each pipe 36 is provided with a downwardly opening slot 40, e.g. from about one-quarter inch to about one and one-half inches in width. The slot is typically about one-half inch wide for a supply pipe 36 that is about five to eight inches in diameter. Each slot produces a downwardly directed sheet-like jet of drying gas 42 (FIG. 2) that impinges on the upper surface of the bed 14 of pellets 10. drying air heated to about 800° F. is supplied to the pipes 36 via a supply pipe 44 from a blower 152.

Figure 4:
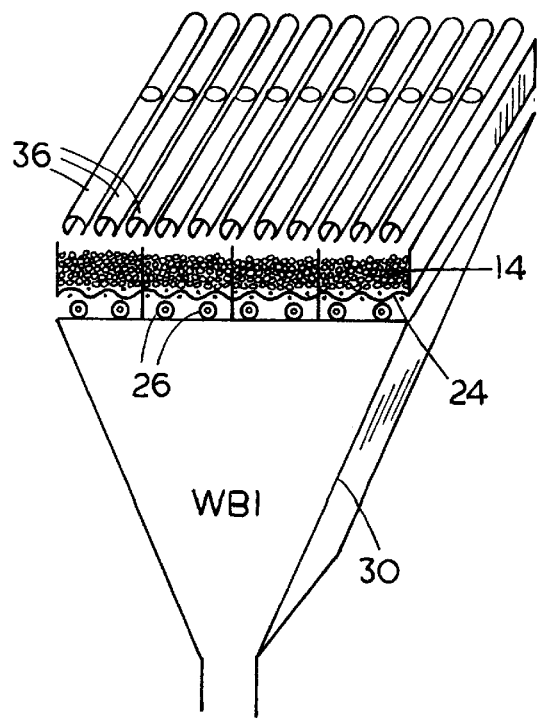
FIG. 4 is a diagrammatic perspective view of a portion of FIG. 3 on a larger scale.
Figure 3:
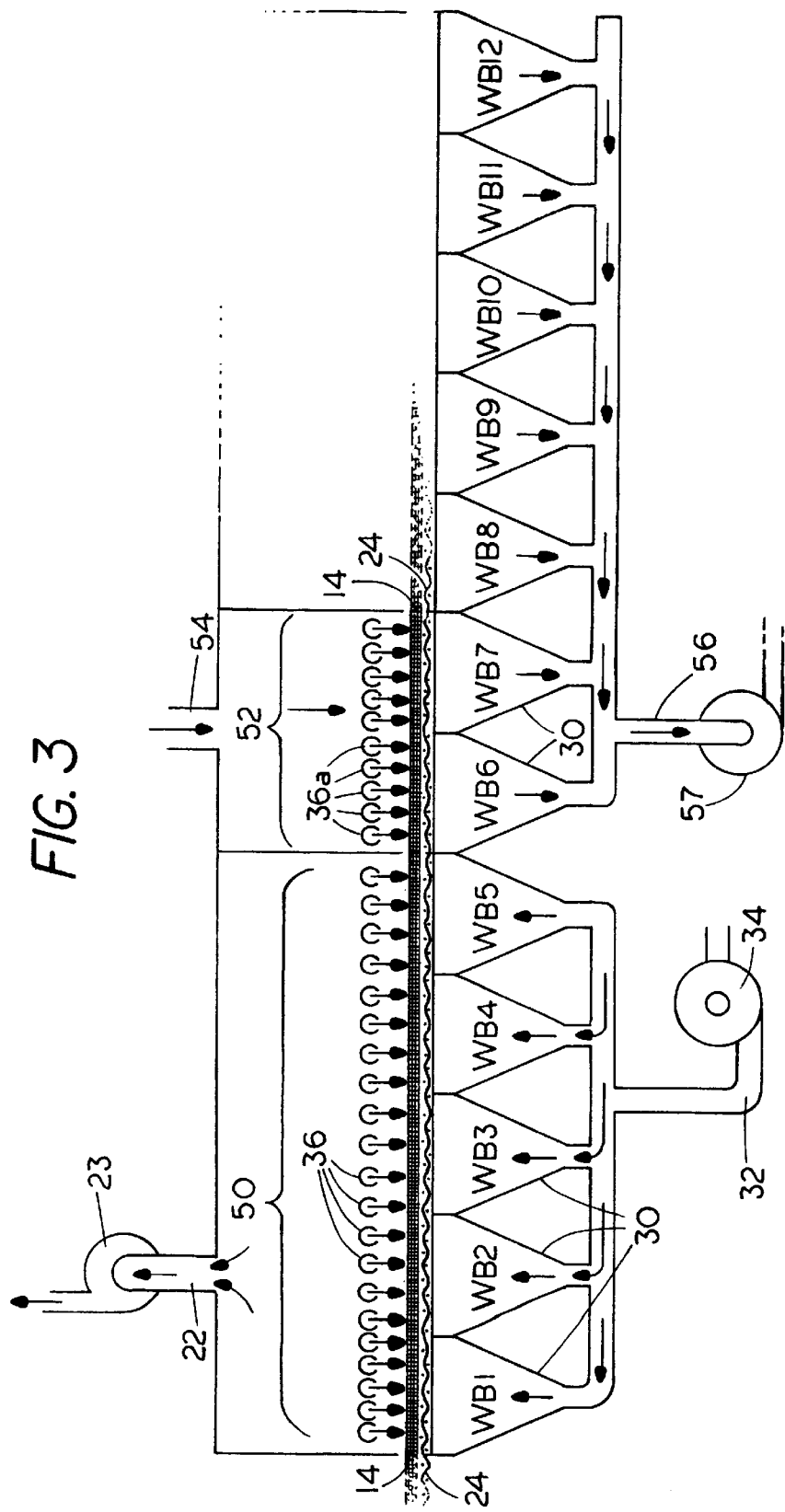
FIG. 3 is a diagrammatic longitudinal vertical cross-sectional view showing successive drying stages in accordance with the present invention.

As shown in FIGS. 3 and 4, typically a plurality of windboxes, e.g five, (WB1–WB5) are provided in a hooded exhaust updraft drying section 50. While the width of the drying bed can vary, it is typically about eight feet wide and consequently the drying pipes 36 are each about eight feet long. The drying air passing through pipe 44 (FIG. 2) is supplied at a rate sufficient to produce a slot velocity of about, say, 3000 feet per minute in the jet 42 as it leaves the slot 40. Typically each eight-foot drying air supply pipe 36 will discharge about 1000 cubic feet per minute of hot drying air. The slot width, the discharge velocity and the cross-sectional shape of the pipes 36 can be changed as desired. The pipes 36 can be round, rectangular, oval or of other shapes best suited to the requirements of the fabricator.

After the bed 14 has passed the last windbox WB5 of the exhaust hood section 50, it enters a downdraft unfired drying zone, i.e., the DDZ 52 (FIG. 3) which is supplied with heated air via duct 54 at a temperature of, say, 800° F. traveling downwardly through the bed 14 thence through windboxes WB6 and WB7 and out through exhaust duct 56 to further dry the pellets 10 in the bed 14.

In FIG. 4 is shown a typical windbox which may be about eight feet wide and about eight feet long as seen in plan view. As shown in FIG. 4, four individual pallets comprising portions of a conveyor cover one windbox. The rate of travel of the conveyor is usually about eight feet per minute, thus any individual pellet is above a windbox for about one minute.

Figure 5:
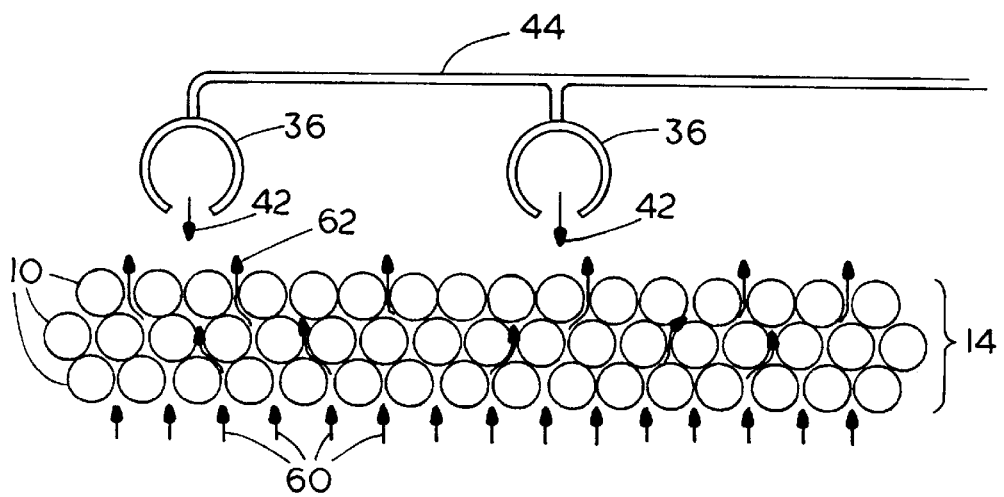
FIG. 5 is a diagrammatic longitudinal sectional view on a larger scale showing the flow of gas during the first stage of drying.

Refer now to FIG. 5 which illustrates diagrammatically the drying in the bed 14 during the initial drying stages above one of the windboxes WB1–WB5 which carry air upwardly through the bed 14. As shown in FIG. 5, a current of heated air 60 flows upwardly through the bed 14 around and between the pellets 10 and is exhausted from between the pellets 10 in the bed 14 as shown at 62. Simultaneously, the jets 42 of hot counter-current drying gas are forced downwardly from the supply pipes 36 and impinge on the upper surface of the bed 14. The downwardly directed jets 42 are effective in further drying the upper layer of pellets 10, particularly the first two to three inches from the top surface of the bed 14 since the upwardly traveling current of air 40 is heavily laden with moisture. While no dramatic increase of pellet temperature is achieved by any particular downwardly directed jet 42, each one-half inch wide jet or sheet of air at 800° F. will have pellets exposed to it and under its influence for about one second. After about one second of heating by the jets, the pellets thus heated will be exposed to cooler air 62 from the upward current of drying air 40 for about 15 seconds, thereby removing some of the heat from each of the pellets heated by the jet 42. Thus, while no particular jet 42 by itself produces a dramatic increase in pellet temperature, it is important to recognize that the jets 42 keep the top layer, say, the top two or three inches of pellets, above the dewpoint temperature of the surrounding drying gas. Thus, the hot air jets in the updraft section 50 minimize condensation that would otherwise occur on the pellets 10 without the jets.

Figure 6:
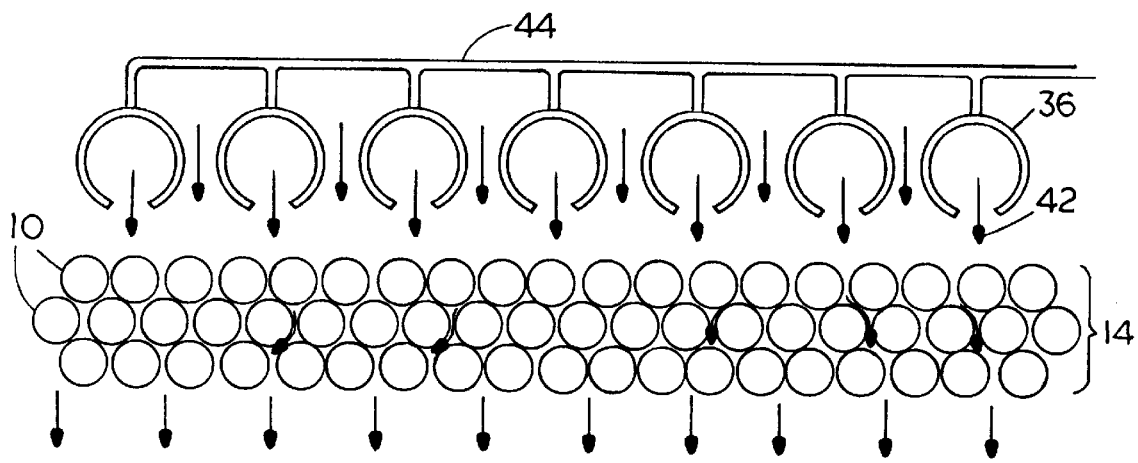
FIG. 6 is a view similar to FIG. 5 showing the flow of drying gas in a subsequent stage of drying.

Refer now to FIG. 6 which illustrates the benefits that are achieved when the pellets 10 enter the unfired downdraft drying zone 52 of FIG. 3. In this section, suction provided by a waste gas fan 57 (FIG. 3) draws waste gas at a temperature of, say, 800° F. downwardly through the bed 14 from the inlet 54. Inlet 54 supplies hot air under pressure to drying zone 52. The hot air supply pipes 36*a* in the downdraft drying section 52 provide momentum to each air jet, forcing air more effectively through the top two or three inches of the pellet bed 14. Significant added drying therefore occurs. The pellets 10 are in the downdraft drying section 52 typically for about two minutes. The very uppermost layer of pellets, say the top one inch of pellets 10 in the bed 14, are usually dried to about 3% by weight water which is located mainly in the center portion of each pellet 10.

Refer now to FIGS. 7 and 8 which illustrate moisture content of the pellets 10 above various windboxes without the downdraft jetting (FIG. 7) and with downdraft jetting (FIG. 8). In windbox WB1, after about one minute with an 800° F. upward current of air, the bottom pellet is dried on the surface while the inside is still wet. The estimated water content is about 8% for about 1–3 inches from the bottom of the bed 14, while the water content at the 4–9 inch level is even greater at about 11% to 12% on average. In FIG. 8 showing the invention, the moisture content of the pellets 10 in WB1 will be about the same as in FIG. 7.

In windbox WB2, without the invention (FIG. 7) the estimated water content will be about 5%, but in the invention (FIG. 8) some water has been removed in the 1–3 inch level. In FIG. 8 at the 4–6 inch level, the water content will be about 8%; at the 7–13 inch level it will be about 12%, and the top inch of pellets may have about a 9% water content. Pellets in the top three inches will be warmed above the dewpoint of the drying air.

In windbox WB3, without the invention (FIG. 7) the estimated water content will vary from about 2% in the 1–3 inch levels and about 12% in the 13–15 inch levels. WB3 in FIG. 8 using the invention will be about the same, with the top layer of pellets back to their original 10% moisture content. The added water does not come from condensation but from physical movement of the water.

In windbox WB4, after four minutes of treatment, the bottom zone is nearly dry in FIG. 7 and at successively higher levels varies from 3% to 11%. In windbox WB4 of the invention (FIG. 8) moisture contents are the same except for the top zone which is only 9%, thus showing the benefit of the present invention.

After five minutes without the invention, the 1–3 inch levels are dry in windbox WB5 and moisture increases up to the 13–15 inch level which is about 10%. By contrast, with the invention in windbox WB5 the top 15-inch level is only about 7% to 8% water and therefore appears dry.

Without the invention (FIG. 7), after one minute of downdraft in windbox WB6, the bottom levels remain the same. At the 13–15 inch level, moisture content is about 8% and in the 10–12 inch level the moisture content is 7%. In the invention by contrast (FIG. 8), the moisture content at the 13–15 inch level is only 6% and that drops to 4% in windbox WB7 and to a very low level, about 3% or below in windbox WB8. By contrast, in windbox WB7 after two minutes without the invention (FIG. 7), the 13–15 inch level is 7% and at 10–12 inches is about 6% moisture.

Assume that the bed 14 travels into the downdraft firing zone WB8–WB12 without the invention. In windbox WB8 after one minute exposure to a downdraft at about 1600° F., the 13–15 inch level would still be at about 6% moisture, too wet for good firing.

Refer now to FIG. 9 which illustrates the temperature of the pellets 10 at various bed thickness levels in the different windbox areas. It will be noted that the temperature achieved with the invention (shown at the top of each pellet) is generally higher than that of the prior art (shown at the bottom of each pellet), particularly in the upper levels, e.g. zones 4 and 5 of the bed 14. It will also be noted that the invention achieves a pellet temperature of 250° F. in zone 5 of WB5. By contrast, a temperature of only 205° F. is achieved in zone 5 without the jets 42. In zone 4, the invention achieves a temperature of 195° F. compared with 165° F. without the downwardly directed jets 42. The pellet temperatures of the invention in zones 3 and 2 in the last windbox WB8 is also higher than without the invention. Thus, the average temperature of the pellets 10 in most zones of the pellet bed 14 is higher using the invention. While the temperature increases due to the hot airjets 42 in accordance with the invention are not dramatic, the invention provides a critical advantage by keeping the top few inches of the pellet bed 14 above the dewpoint while in the updraft drying zone 50. An important temperature improvement is also achieved by the present invention in the downdraft drying zone 52 of the furnace.

Refer now to FIGS. 10 and 11 wherein the same numerals refer to corresponding parts already described. In FIG. 10, the heated drying air supplied to the pipes 36 is provided by means of a pair of supply ducts 44*a* and 44*b* connected to opposite ends of the pipes 36 to assure equal distribution of hot air that is forced downwardly through the slots 40 to provide the downwardly directed sheet-like currents of air 42 (FIG. 2). The ducts 44*a* and 44*b* can be used to assure that an equal air supply is provided to each end of the distribution pipes 36. In the alternative, a single supply duct 44*a* can be provided with equal distribution achieved through dampers or blast gates (not shown) within the distribution pipes 36.

In FIG. 11, hot air is supplied to four distribution pipes 36 at the top of the figure by the supply duct 44*a* at the left and to the remaining distribution pipes 36 are supplied by the supply duct 44*b* at the right. Thus, in this case, the hot air which may be supplied from a suitable furnace location via a blower (not shown) is introduced to opposite ends of different ones of the distribution pipes 36 so that any differences at opposite ends of a given pipe, as well as different temperatures in the duct 44*a* versus duct 44*b* will cancel out after all of the pellets have passed the distribution pipes 36. Any one side of the furnace should not be supplied by significantly more air (say, more than 25%) than the other side. Balancing in FIG. 11 can also be assisted by the use of dampers such as dampers 49 and 51.

Pellet drying Mechanism

In the updraft drying zone, water is first removed from the surface of the pellet and from a thin layer of the concentrate on the outside of the pellet. This drying occurs before the hot air is saturated with water vapor. The evaporation of water, however, lowers the temperature of the air consistent with the heat of vaporization of water. The air temperature is also lowered slightly due to sensible heat transfer.

When the saturated air comes in contact with cold pellets above those that were being dried, water condenses on the colder pellets. The condensing action warms the pellets significantly, but because in the beginning there is an abundance of cold pellets, most of the water is condensed before the air reaches the top of the pellet bed. This is particularly true if one considers the progression through the drying zone as occurring in one-minute increments as described in the earlier drawings.

The evaporation and condensing occur for the entire five-minute drying zone. Some of the less obvious characteristics of pellets should be understood to appreciate the advantages achieved during the drying of pellets. Some of the mechanisms of pellet drying will therefore be explained in more detail.

The surfaces of pellets are initially moist so that when hot air is forced up and around a pellet, the surface water and some of the water in a thin layer of pellet material is evaporated. When this occurs, some heat is transferred by water into the center of the pellet because water conducts heat fairly well. The water in the center of the pellet is warmed to a temperature below the boiling point of water, but probably near 150° F. in some instances. After the surface water leaves the pellet, there is significantly lower transfer of heat into the center of the pellet because the finely ground particles do not transfer heat efficiently due to little surface-to-surface particle contact. This may first appear to be a problem, but careful consideration will show that it provides advantages in drying taconite pellets. updraft drying is actually improved because most of the bottom pellets have the surface water removed from the bottom of the pellet bed, then very little heat transfer takes place at that level and the hot air contacts the next upper layer of pellets. The same mechanism takes place on subsequent upper layers of pellets. The pellets near the top of the bed are not adequately dried due to furnace tonnage requirements, but the top pellets are warmed to about 180° F. for most operations.

The hot air jets 42 warm the surface of the top two inches of the pellet bed above the dewpoint temperature. The combination of the warm updraft drying air plus the hot air jets 42 result in a dry surface on the pellet including a thin layer of dried concentrate on the surface of the pellet. The pellets that leave the updraft drying zone that were also heated by the hot air jets 42 enter the downdraft drying zone of the furnace hot and dry enough to benefit from the hot air jets in that section of the furnace.

The top few inches of pellets entering the downdraft drying zone are heated continually for the next two minutes with the hot air jets forcing air down into the bed of pellets. The normal furnace drafting will continue to draw the hot air through the pellet bed. The top few inches of pellets are dried much better because of the hot air jets. The slow transfer of heat described earlier still exists, but water is removed from the center pellet faster with the addition of the hot airjets. The pellets leaving the downdraft drying zone are thus heated well above the boiling temperature of water. While some water may still be bound hydroscopically to the binders or other additives, most the water will be removed.

In the downdraft firing zone of the furnace, the air temperature is high enough, e.g., 1800° F., to start oxidizing the top pellets. The oxidation will be slow because of the slow transfer of heat described earlier (due to small irregularly shaped particles) and also because of the low oxygen content of the air. Slow oxidation may prove to be a benefit because there is a minute or two available to permit the heat from oxidation to remove all the water from the center of the pellet, which is an important advantage since water in the center of pellets retards oxidation and results in the magnetite core in the center of pellets. This dissimilar material is the main reason that pellets have a lower than desired compression test.

With no hot air jets, some pellets leave the updraft drying zone 50 saturated with water. When the pellets reach the downdraft drying zone, the hot air does not penetrate the layers of wet pellets. The hot downdraft drying air evaporates the surface moisture is cooled by the heat of vaporization. Further drying is slowed and, as a result, when the pellets leave the downdraft drying zone they have a center that has about 5% water. The hot gases in the downdraft firing zone begin the oxidation of the magnetite pellet. The oxidation is severely retarded by the water in the center of the pellet. The water that is evaporated prevents heat transfer and oxygen transfer. The result will be pellets with magnetite cores and a low compression test rating. The present invention drastically reduces or eliminates all of these problems.

The invention will thus heat and dry the pellets more effectively and more uniformly than the prior art. It can be seen that an important advantage of the invention derives from heating the pellets on the top two or three inches of the pellet bed 14, since those are the pellets that have the poorest quality. The fact that the top pellets stay wet is one of the factors that produces pellets of lower quality. Another factor is that pellets were heretofore fired in a low oxygen atmosphere because oxygen is consumed in raising the air temperature to about 1800° F. and later to about 2400° F. in the firing zone (windboxes WB8 and above). Preliminary calculations indicate that the distribution pipes 36, while they can be of various sizes, should have a diameter of about eight inches for a one-half inch slot 40. However, with a smaller distribution pipe of, say, four to five inches in diameter, dampers and baffles can be installed as will be apparent to those skilled in the art to achieve an approximate equal volume of air blowing out through all of the slots 40. It should be understood that the distribution of air does not have to balanced perfectly and, as shown in FIGS. 10 and 11, balancing can be accomplished by feeding air to opposite ends of the distribution pipes 36 rather than to the center (FIG. 4).

An important advantage of the present invention is its adaptability for use in existing pellet drying equipment, that is, as an after-market unit to be installed in equipment now in use. Other benefits of the present invention will be better understood when one considers that for each 200 tons of product produced with 10% water, there is an input of 220 tons of material. Because of the spherical shape of the pellets and the water present, the density of the pellets is about two or slightly less. Therefore, a cubic foot of pellets weighs about 100 pounds. Two hundred twenty tons per hour is 3.7 tons per minute, or 7,330 pounds per minute, i.e., 73 cubic feet per minute. On a machine eight feet wide with a bed 15 inches deep, the machine would have to move 7.3 feet, or about 90 inches a minute to maintain a steady operating production rate. This volume of material shows that even a small reduction in moisture has far-reaching benefits.

It has been observed that moisture condenses inside the exhaust hood in some prior art installations. Moisture can and does also condense on cold pellets. The present invention reduces both of these conditions and in that way improves the final product.

Thus, the present invention enhances drying by using the downward jets 42 of hot air impinging on the top layer of the pellets to heat the top layer of pellets above their dewpoint temperature so the pellets are dryer on the top of the pellet bed 14 from the drying in the updraft zone 50. The downward jets in the downdraft drying zone will dry the pellets in the downdraft zone 52 at least three or four inches deep into the pellet bed 14. The pellets 10 typically pass through this zone of the furnace in two minutes and are much drier leaving the downdraft zone 52 than they would be without the present invention. In the final zone of the furnace, the downdraft drying fired zone (windbox WB8 and higher) the pellets are heated to about 1800° F. Because of the improved drying made possible by the present invention in zones 50 and 52, improved firing can be achieved without damaging the pellets.

Additional features of the invention will now be described with reference to FIGS. 12–15 wherein the same numerals refer to corresponding parts already described.

A typical prior traveling grate furnace has seven windboxes dedicated to drying magnetite pellets and five windboxes dedicated to firing the pellets. These furnaces may have about eight feet of firebricks in a wall 100 at the end of the firing zone that separates the firing zone 102 from the heat recovery zone 104 of the furnace. The firing zone 102 is often heated to 2400° F. in the ignition zone of the furnace. The firebricks in wall 100 used to separate the ignition zone 102 from the heat recovery zone 104 are heated to 2400° F. on the furnace side and about 850° F. to 1100° F. on the heat recovery zone of the furnace.

Operating characteristics of a furnace can be analyzed by conducting tests using thermocouples to measure the temperature at established pellet depths throughout the various zones of the furnace. One measurement of interest is the temperature two inches below the top of the pellet bed. It should be noted that thermocouples indicate the air temperature moving through that area of the pellet bed, the radiant heat from the hot pellets, particularly while the pellets are being oxidized, and often surface contact between the thermocouple and the hot pellets. These sensing variables must be considered when evaluating temperature measurements using a thermocouple. With these limits in mind, a thermocouple test provides very useful data for the evaluation of a production furnace used for firing magnetite pellets in the taconite industry.

Considering the top two inches of the pellet bed 14, a thermocouple temperature measurement indicates a very low temperature increase in prior art furnaces updraft drying zone (UDZ) 50. The same thermocouple position indicates temperatures (hot air temperatures) nearly equal to the downdraft drying zone (DDZ) air temperatures in section 52 of the same furnace.

A maximum temperature of about 2400° F. is measured in the firing or ignition zone 102 of the furnace. The area of particular interest is the firewall 100 separating ignition zone 102 from the heat recovery zone or recuperation zone 104. This area is typically constructed of heat resistant brick, about eight feet wide and about six inches above the top of the pellet bed 14. The standard thermocouple tests indicate a temperature of 2400° F. through the entire eight foot width of the firewall 100. The hot air is sucked down through the pellet bed 14 in the ignition zone 102. Part of the high temperature can be attributed to the fact that the furnace pressure is slightly positive (0.05 to 0.10 inches water gauge) This pressure will drive some combustion gasses towards the heat recouperation zone of the furnace. Because the hot combustion gasses are sucked down through the bed of pellets 14, the supply of positive air pressure is neutralized. Therefore it is reasonable to postulate the theory that reflected radiant heat is most likely responsible for maintaining the 2400° F. temperature in the zone below the firebrick in the furnace. The oxygen in the gasses below the firebrick zone 100 is low. The estimated oxygen content would probably be 10% to 15% as a high value.

When the thermocouple passes beyond the firebrick zone 100 of the furnace, the temperature lowers significantly, immediately reaching a temperature below 1500° F. By the time the thermocouple has traveled eight feet the temperature is less than 1000° F. This is significant because the hot air traveling downward into the pellet bed contains 21% oxygen. Previous sources have determined that little effective oxidation occurs when the pellet temperature is less than 1500° F. Pellets on the top of the pellet bed 14 usually are of the lowest quality of the entire depth of the pellet bed. The lower quality is because the pellets had excessive water content when the pellet firing began. The result of this higher-than-desired water content is magnetite cores and also cracks in the pellet structure possibly caused by the pressure increase due to escaping steam. The pellets with the small cracks usually have magnetite cores. It would be desirable for the top pellets to be oxidized by being exposed to temperatures exceeding 1600° F. with 21% oxygen. However, the higher temperatures are not achievable in the present operating conditions. Obviously oxidation occurs at lower temperatures, however the oxidation rate would not be adequate to improve the quality of pellets on the top of the pellet bed.

There are two major shortcomings in prior art furnaces. First, I find there is very little oxidation of the pellets under the firebrick zone 100, even though the temperature is about 2400° F. Second, I have found that the top of the pellet bed loses heat by radiation to the walls of the recirculation hood. Practically no heat is radiated back to the top of the pellet bed. The area in the firebrick zone 100 at the end of the furnace has adequate temperature to oxidize some of the magnetite cores in the center of the pellets, but the reaction proceeds very slowly because the oxygen concentration is too low.

The furnace zone after the firing zone 102 is called the recuperation zone 104. The recuperation zone 104 is where the majority of pellets are fired. If it is correct to say that the top two inches of the pellet bed 14 is fired in the firing zone 102 of the furnace, then the bottom 14 inches of the pellet bed is fired in the recuperation zone 104 of the furnace. The pellets fired in the recuperation zone 104 are fired in a concentration of nearly 21% oxygen. In accordance with the present invention, furnace modifications are located above the pellet bed in the recuperation zone. The present invention is intended to improve, among other things, the quality of the top two inches of the pellet bed. A slight but significant improvement will benefit pellets fired in the recuperation zone.

Firing in the production furnaces proceeds as described. The partially dried pellets leave the updraft drying zone (UDZ) and enter the downdraft drying zone (DDZ) 52 before being conveyed to the firing zone 102. In the firing zone 102, i.e. downdraft firing zone (DFZ), combustion of the chosen fuel takes place. The temperature in the firing zone 102 is raised initially to 1600° F. to 1800° F. The pellets can then be heated to about 2100° F. in a preheat zone and finally to about 2400° F. in an ignition zone. The heated gasses and water vapor are drawn through the pellet bed 14 by a fan generally called the waste gas fan.

The pellets are then conveyed under the firebrick area 102 separating the faring zone 102 of the furnace from the recuperation zone 104.

Refer now especially to FIGS. 14 and 15. The recuperation zone 104 fires the majority of the pellets. Firing occurs because the fan under the recuperation zone 104 draws relatively hot air down through the pellet bed 14. The hot air is drawn through a section of the pellet bed where oxidation from magnetite to hematite is occurring. This is an exothermic reaction. The oxidation takes place in a high pellet temperature zone 105 (FIG. 14) about two inches below the top of the pellet bed 14 while the pellets are below the firebrick area 100 of the furnace. Because of limited oxygen for the reaction, the same area is oxidized over the second windbox (#14) in the recuperation section of the furnace. The heated air above windbox #14 contains about 21% oxygen, so that oxidation takes place efficiently. The area of the pellet bed 14 that is being oxidized is somewhat easier to visualize if one considers the combustion zone to like a blanket. The zone is across the entire width of the conveyor in a traveling grate machine, and slightly below the two-inch depth in this example. The pellet oxidation layer is constantly drawn down in the pellet bed by the suction of a recuperation fan 106 that serves that section of the furnace.

By reference to FIGS. 14 and 15 it will be seen that the oxidation zone or layer designated 107 has a thickness of two to three inches at the top of a 16-inch thick bed of pellets. The pellet bed thickness as well as the pneumatic resistance and the negative suction of the recuperation fan control the speed that the oxidation layer progresses in a downward direction. It is necessary that the pellet oxidation be completed in the recuperation zone of the furnace.

Figure 12:
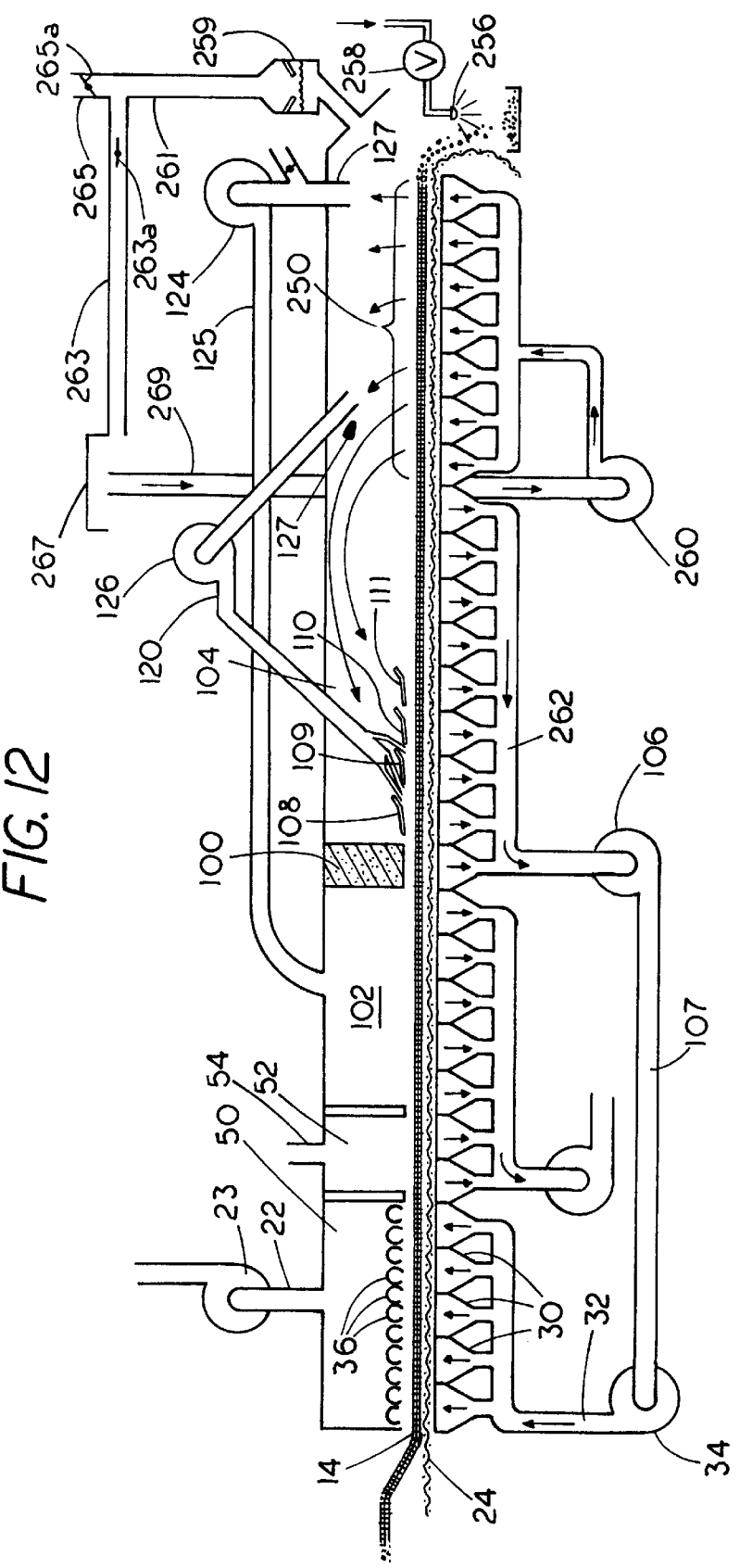
FIG. 12 is a diagrammatic vertical longitudinal sectional view illustrating other aspects of the present invention.

The next zone of the pelletizing machine is the updraft cooling zone (UCZ) 250 (FIG. 12). Here relatively cool air is blown up through the pellet bed 14. The purpose of this zone is to cool the pellets, but a more important purpose is to recover heated air for combustion purposes in the firing zone of the furnace. In the recuperation zone of the furnace, most of the recovered hot air is sucked down through the pellet bed to provide hot air containing about 21% oxygen for improved pellet oxidation.

In accordance with the invention, radiant heat reflectors 108–111 (FIGS. 12, 13 and 17) are installed with reflector 108 nearly touching the firebrick wall 100. The remaining radiant heat reflectors 109–111 can be mounted in-line with reflector 108, with an opening between each adjacent reflector as shown. The radiant heat reflectors 108–111 should be nine feet in length and placed about four inches above the pallet side plates of conveyor 24. The travelling grate conveyor 24 is a multitude of pallets eight feet wide by two feet in length. The pallets have wheels that roll on standard railroad tracks (not shown) in and outside the furnace. The radiant heat reflectors 108–111 can comprise a layer of a suitable reflective ceramic substance, e.g., firebricks, and an initially plastic but fusible type of ceramic insulation such as Gunnite®. However, other materials with even better reflective properties can be installed as will be apparent to those skilled in the art. The radiant heat reflectors 108–111 each have a sturdy steel supporting frame 112 (FIG. 13) connected to the wall or floor of the furnace. The purpose of the radiant heat reflectors, as the name implies, is to reflect radiant heat back onto the pellets on the top of the pellet bed 14.

Therefore, in a typical oven each radiant heat reflector is eight feet wide and nine feet in length. One end portion of the radiant heat reflector about three feet long is angled upwardly about 30 degrees. The second radiant heat reflector 109 is placed eight feet from the end of the first radiant heat reflector 108 so that the end of the second radiant heat reflector is under the angled end portion of the first reflector. The second radiant heat reflector is shaped like the first one with the final three feet angled upwardly 30 degrees. There may be an advantage of installing four or even more such reflectors. More can be installed depending on the benefit derived from the first four in a particular oven.

The purpose of the radiant heat reflectors 108–111 is to raise the temperature of the top pellets of the pellet bed 14. This is accomplished by reflecting back some of the heat lost by radiation. An increase in temperature should accelerate the oxidation of pellets requiring increased oxidation. The oxidation of pellets lower in the pellet bed will be enhanced slightly due to the increased temperature that results from the radiant heat reflectors.

It must be understood that the radiant heat reflectors will raise the temperature of the pellets as compared to the pellet temperature without the use of the radiant heat reflectors. The radiant heat reflectors reduce the radiation mechanism by which pellets lose much of their heat. The radiant heat reflectors action does very little to heat the air. The air is heated by flowing around and contacting the hot pellets.

The first radiant heat reflector 108 should produce the greatest effect. The temperature of the top of the pellet bed 14 should average about 2200° F. With an oxygen content of 21%, the first radiant heat reflector 108 is expected to oxidize some of the pellets with magnetite centers and also some magnetite centers of the pellets with cracks caused by escaping steam. The second radiant heat reflector 109 improves the oxidation of magnetite cores, especially if the added time is beneficial. The temperature under reflector 109 may be as high as 1500° F. The temperature is lower for each additional radiant heat reflector 110, 111. These results occur without considering additional features of the invention described hereinbelow.

Another advantage of the radiant heat reflectors is to improve (raise) the oxygen content of the gasses beneath the firebrick area separating the ignition furnace from the recuperation zone 104. A fan is used to collect hot (as hot as practical) air and direct it towards each radiant heat reflector 108–111 (FIG. 13).

Figure 17:
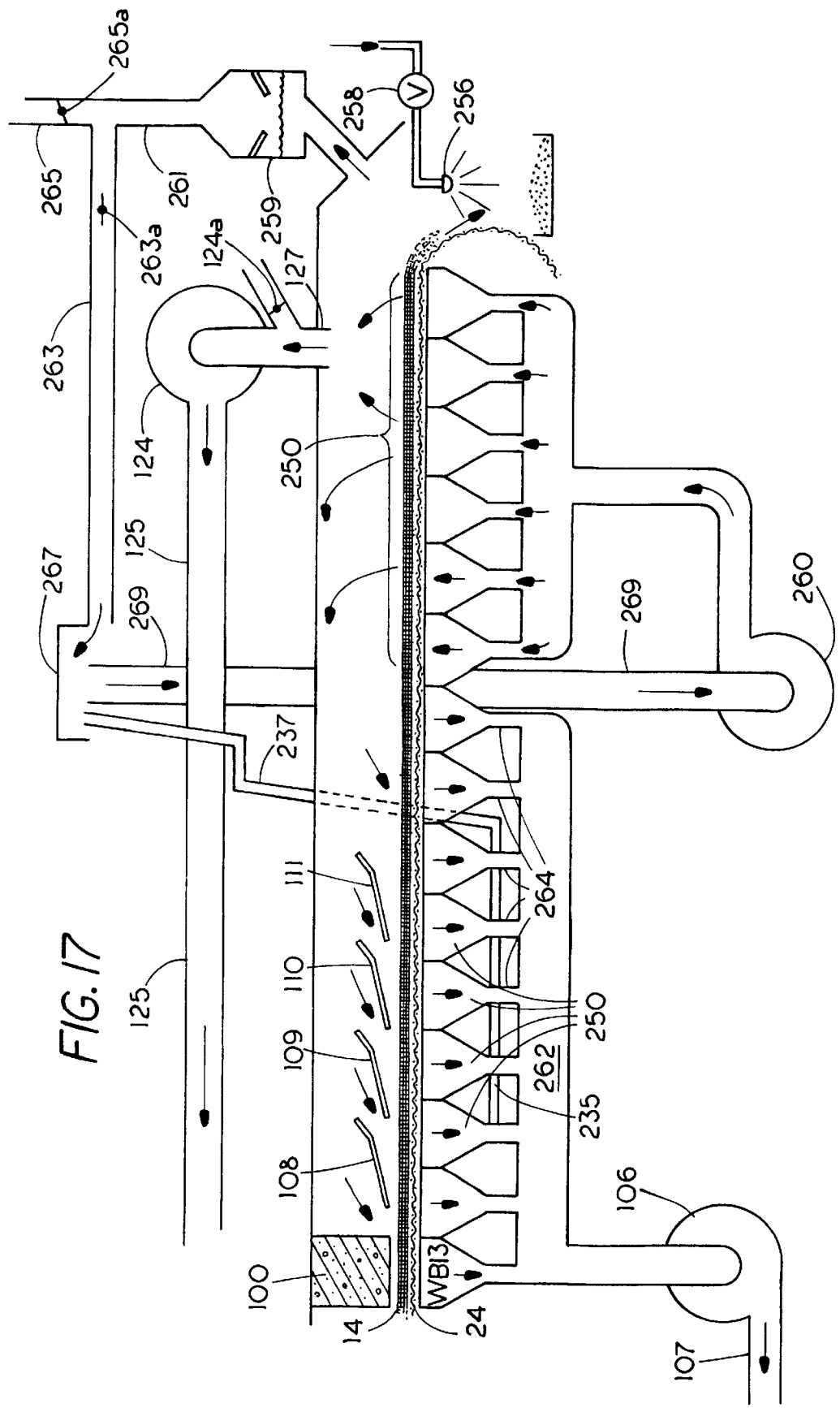
FIG. 17 is a diagrammatic sectional view on a reduced scale relative to FIG. 16 to illustrate the furnace from windbox 13 to its outlet end with ductwork 120–122 removed for clarity.

Refer now to FIGS. 13 and 15. Hot air is supplied through ducts 120–123 at sufficient velocity by a special fan 126 or, if desired, an air ejector of known construction for this purpose that draws air from the updraft cooling zone (UCZ) 250 near its outlet end at 127 to provide momentum to the air under the reflectors. The fan 126 inlet is located where the maximum air temperature is within the fan's operating limit. Additional air moving devices such as air ejectors of suitable known construction can, however, be used to direct air at temperatures above the safe operating temperature for a fan. The air is given the momentum required to go under the firebrick area. The system provides sufficient volume and momentum to the air to cause the air to travel under the firebrick zone 100, preferably about five or six feet under the firebrick area. There is sufficient air volume to provide oxygenated air (21% oxygen) to make up to 50% of the air being sucked into windbox #13. The added oxygen and the high temperature is calculated to oxidize the magnetite cores and cracked pellets that have such a negative impact on pellet quality and reduced low temperature breakdown (LTB). The radiant heat reflectors 108–111 and the additional fan 126 (FIGS. 12 and 17) provide higher quality product, as well as extra furnace capacity as an additional option. FIGS. 12 and 17 show how furnace air at the outlet end of the furnace passes through a dust collector 259 of the wet type through ducts 261 and 263 (and optionally to the atmosphere through outlet 265) to a collection hood 267 in the nature of an inverted trough at or near the ceiling. Air from the hood 267 is forced by updraft cooling fan 260 into the updraft cooling zone windboxes 250.

Above the UCZ 250, hot air is withdrawn at 127 by furnace fan 124 and forced via duct 125 into the firing zone 102 (FIG. 12). A tempering air damper 124a (FIG. 17) near the inlet of fan 124 is used to admit room air if furnace air is above the operating temperature of fan 124. Control dampers 263a and 265a are provided in ducts 263 and 265, respectively. Recuperation fan 106 forces air via duct 107 to fan 34 supplying air to the UDZ 50.

Figure 16:
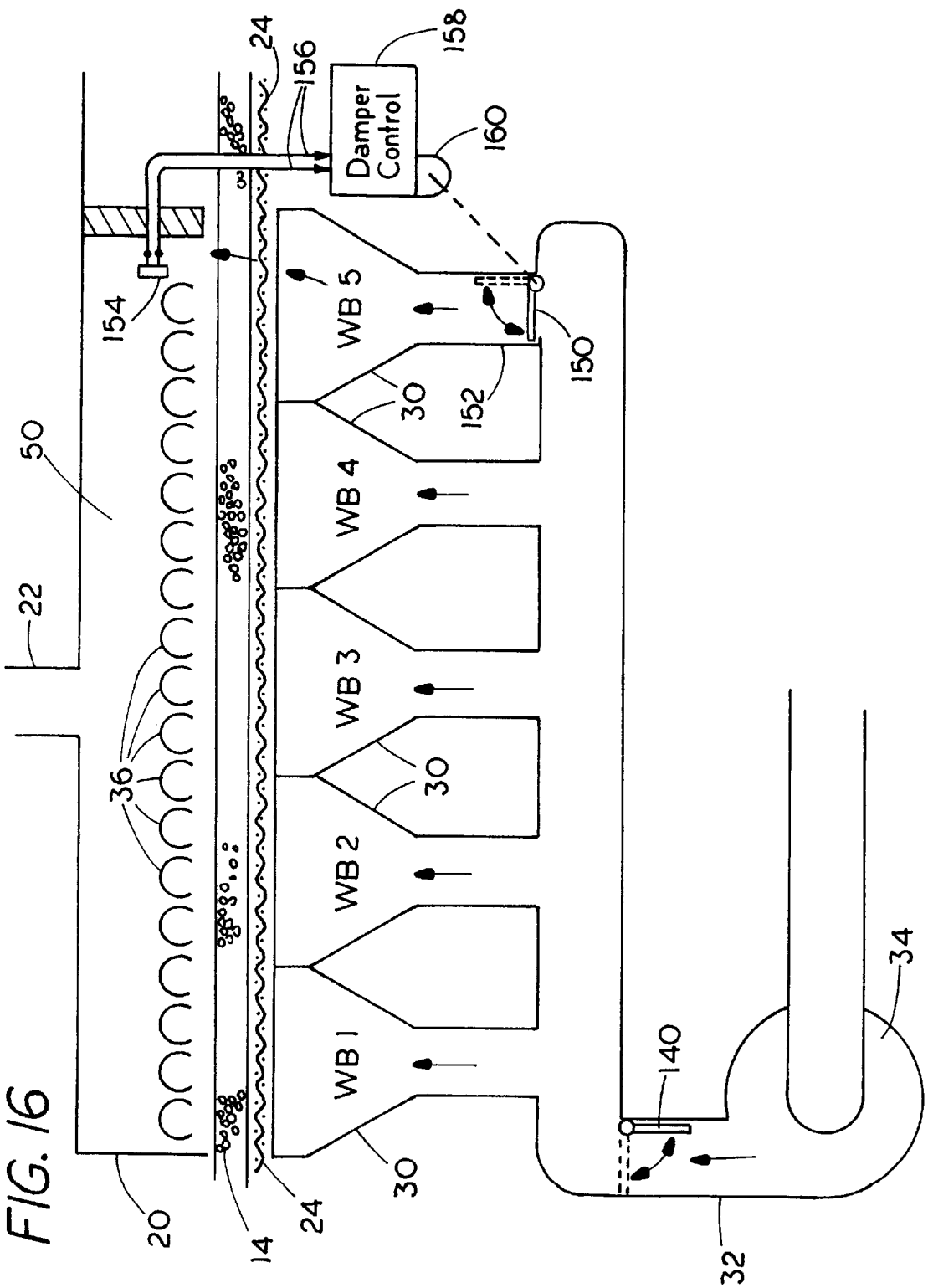
FIG. 16 is a diagrammatic sectional view on a scale smaller than FIG. 15 of windboxes 1–5 to show air control to windbox 5.

Refer now to FIG. 16 in connection with another feature of the present invention wherein the same numerals refer to corresponding parts already described.

The taconite pellets are placed upon an eight-foot-wide grate 24 traveling grate pelletizing machine at a pellet depth of about 15 inches to form a bed 14. As already noted, the first zone of the furnace is the updraft drying zone (UDZ). The purpose of the UDZ is to supply hot air at 850° F. to begin drying the taconite pellets. The grate 24 travels about eight feet per minute. Each of the five windboxes is eight feet by eight feet. Therefore, to travel above all five windboxes (40 feet), any individual pallet (also any individual pellet) will be in the UDZ for five minutes.

The hot drying air is supplied by a large updraft drying fan (UDF) 34 (FIG. 16) that forces a current of air up through the bed of pellets 14. The UDF characteristics and the volume of air supplied to the fan determine the volume of air and the static pressure that provides the energy to force air up through the bed of pellets 14. The volume of air in cubic feet per minute and the static pressure measured in inches of water column height provide information to the machine operators. The static pressure measured is the result of fan air pressure and volume plus the pneumatic resistance of the bed of pellets. Pressures are measured in inches of water gauge. A common value is, say, 30 inches water gauge. The pressure is distributed evenly throughout the UDZ of the furnace.

It must be understood that the process of drying pellets consists of hot air evaporating water from pellets on the bottom of the pellet bed 14. Evaporating water cools the stream of hot air by an amount consistent with the heat of vaporization of water. The slightly cooler air eventually becomes saturated with water (100% relative humidity). The temperature of the saturated air is equivalent to the dew point temperature. When the saturated air comes in contact with pellets cooler than the dew point temperature, water is condensed out of the air stream and forms on the cooler pellets. When water condenses on the cooler pellets, the pellets are warmed by the amount of heat consistent with the heat of vaporization of water. Subsequent evaporating and condensing move up through the pellet bed to heat the pellets and remove water from the surface and interior of the pellets in the UDZ of a typical pelletizing machine.

The drying action progresses further in each windbox 1 through 5. As the drying progresses, so does the volume of air that is forced up through the pellet bed 14. Although the static pressure under the pellet bed 14 remains constant throughout the entire UDZ, the volume of air passing through the bed increases relative to the lower pneumatic resistance of the pellet bed because of the reduced water content of the pellets, primarily due to reduced surface water content. Thus, more air goes through the pellet bed 14 as the pellets travel through the UDZ of the furnace. More air flows through windbox 5 than any other windbox relative to the area exposed to the updraft drying zone air.

Another way to describe the pneumatic resistance variation is to consider that moist pellets have a tendency to adhere to the other moist pellets that make up the pellet bed. Though the water is removed slowly from the pellet bed, the water removal increases with time in the UDZ of the furnace. This would be one more way to explain that more air passes through the area of the UDZ that has the least water on the surface of the pellet. The least surface water obviously exists at windbox 5. An additional way to explain the increase in airflow is to consider the weight of pellets relative to their water content. The weight of material is less as the water is evaporated over time. Again, windbox 5 can be seen to have the driest and lowest weight pellets.

These concepts are introduced to help explain what happens when additional conditions exist or are created that reduces the pneumatic resistance of the pellet bed. Inadvertent conditions sometimes occur that cause a decrease in the pneumatic resistance or otherwise permit an increase in the airflow through a small segment of the pellet bed. This condition is called a blow hole.

Lower pneumatic resistance can be caused by a decrease in pellet bed thickness that may occur when the furnace pellet supply is momentarily reduced making a low spot on the bed. The more common cause is a broken grate bar. Grate bars make up the bottom of the pallets that are the essential part of the traveling grate conveyor that transport the pellets through the various zones of a pelletizing machine. It is easier to explain what occurs in a blow hole caused by a broken grate bar. Consider that a grate bar is 1¼ inches wide and 24 inches long. A broken bar may have about three inches missing. This will create a small hole at the bottom of a pallet. When green pellets or hearth layer pellets are placed upon the traveling grate conveyor, a portion of the pellets will fall through the hole. This will slightly reduce the pneumatic resistance in this small section of the traveling grate conveyor.

The traveling grate conveyor continuously moves the pellets to the first zone of the furnace called the updraft drying zone (UDZ). The UDZ forces hot air up through the pellet bed with a pressure of about 30 inches water gauge. Due to the broken grate bar and the lower pneumatic resistance, hot air will preferentially flow through the small area of lower resistance. The airflow will increase until after four minutes (at the end of windbox 4) there may be a small channel through the pellet bed 14. This will permit hot air to preferentially flow through this area of reduced pneumatic resistance. Additional pellets along the side of the hole, plus many on top of the hole area, will be carried by the air with its higher velocity above the pellet bed. The pellets will break and form a dust cloud that can be detected. When a dust cloud or blow hole is detected, a large furnace damper shuts off the air in the updraft drying zone of the furnace (FIG. 16).

The damper 140 closes in about 30 seconds. When the damper 140 is closed, very little hot air goes through the pellet bed 14. After about 60 seconds, the operator or other control mechanisms start to open the damper 140. Opening the damper 140 takes about 60 seconds if there are no other blow hole problems. Air is restricted in the UDZ for a total of about 2½ minutes. During that time the grates travel about 20 feet. When the air in the UDZ is restricted, the flow of air through the recuperation zone is also restricted, adversely affecting another 20 feet of pellet firing. In the UDZ an additional 20 feet of the pellet bed 14 has about 50% of the normal drying air. The reduced air volume adversely affects pellet quality. The same condition occurs in the recuperation zone 104, duct 262 (FIG. 12) where an additional 20 feet is adversely affected because the pellets there require 100% of the available airflow for complete oxidation. During the same 2½ minutes, the blow hole goes into the firing zone of the furnace. The reduced pneumatic resistance results in more hot combustion air going through the area where the blow hole occurred, thereby adversely affecting the pellets in the entire 40 feet of the firing zone of the furnace.

These problems continue for a few more minutes, but with reduced severity. It must be understood that the problems that I am presenting are not complete disasters, but rather conditions that an operator would want to avoid today because of the current requirement for high quality pellets. A small blow hole would create lower quality production for about one-half hour. During the same time period the pellets produced have characteristics that contribute to the dust problem. The pallet with a broken grate bar would have to be identified and removed at considerable time expenditure and inconvenience. Quite often, two or three blow holes occur before a pallet is removed.

During the time of a blow hole, another adverse change takes place. Besides physically blowing a hole through the pellet bed, a large volume of pellet fragments settle back onto the surface of the pellet bed. These fragments restrict airflow by slightly sealing the pellet bed. When fired, the fragments in essence become broken pellet chips.

To solve the blow hole problem, the present invention provides a damper 150 to shut off air to windbox 5 only when a blow hole is detected. The damper 150 is installed on the main header 152 to minimize the movement of the crossover duct when the damper is closed. The closing of the damper 150 is controlled by a photocell 154 that senses pellet dust near and above the end of windbox 5 (FIG. 16). The photocell 154 is wired by conductors 156 to a controller 158 and damper motor 160 which is in turn connected to the damper 150 for shutting the damper 150 when pellet dust activates photocell 154. An important advantage is the immediate action that is provided. A single windbox cut off from the air supply still leaves the other four windboxes to provide their full volume of drying air. The damper 150 is closed in about five seconds and opened in about 10 seconds. However, after closing, the controller 158 automatically opens damper 150 again after about another 20 seconds. Considering the short time (35 seconds) that air would be restricted, a minimum amount of pellets would be exposed to reduced drying air. Also with the quick response, the blow hole would not become enlarged and therefore could be kept small.

The benefit resulting from the reduced area of lower quality pellets and the reduced time of exposure to restricted air flow is shown in Table 1 below.

TABLE 1

| Length of Restricted Air Flow Area | | |
| --- | --- | --- |
|  | Prior Art | Invention |
| Updraft Drying Zone | 40 feet | 8 feet |
| Recuperation Zone | 40 feet | 8 feet |
| Firing Zone | 40 feet | 8 feet |
| Total | 120 feet | 24 feet |

Other aspects of the invention will be better understood by reference especially to FIGS. 12 and 17 in which typical operating conditions of the invention are presented by way of example.

The updraft cooling zone (UCZ) 250 of a standard traveling grate furnace is designed to transfer heat from a mass of fired pellets to be used in other sections of the furnace. The heat is transferred to air that is forced up through a bed of pellets (hematite pellets with some magnetite cores). The mass of pellets estimated temperature exceeds 1200° F. The pellets have a specific heat of 0.16. Using the engineering measuring and calculating devices are somewhat misleading. The heat transfer mechanism is confounded by the fact that air blowing by hot pellets cool the outer circumference of the pellet, but the center mass is not cooled as efficiently because of the poor heat transfer properties of the pellet structure. It must be realized that the pellets are in the updraft cooling zone for about six minutes. When the pellets leave the last UCZ windbox, the surface temperature increases significantly because the center of the pellets are significantly hotter than the pellet surface.

Dry air has a specific heat of about 0.10 and water vapor has a specific heat of 0.13 An important objective of the invention is to increase the amount of water vapor in the UCZ air. It must be understood that water vapor is present during the summer months so as to provide an average dewpoint of about 40° F. value. This dewpoint corresponds to about 0.005 pounds of water per pound of dry air. The average dewpoint during the winter months, however, is about 0.001 pound of water per pound of dry air. Humidification of the UCZ air that results from the present process will increase the dewpoint to about 65° F., with a corresponding water content of 0.012 pounds of water per pound of dry air. The total air flow of the UCZ is about 160,000 scfm with a weight of 12,000 pounds per minute dry air and with humidification of about 140 pounds of water per minute.

Unconditioned UCZ air at 250 will have a normal water content of less than 0.5% in the summer and about 0.1% in the winter months. According to the present invention, the UCZ air is conditioned by the addition of moisture. The conditioned UCZ air will have a water vapor content of about 1.2% during both seasons, or 2.4 times the water vapor content during the summer and 12 times the winter value.

The additional water vapor will provide the benefit of enhanced cooling of the pellets while the pellets are passing through the UCZ. It is estimated that the pellets may be 30° F. to 50° F. cooler. The pellets will have a temperature of about 450° F. rather than the 500° F. for an equivalent prior art system without conditioning. These temperatures are the average temperature for the pellets leaving the UCZ of the furnace and appear to be much hotter than the desired temperature, but are what commercial systems are designed to produce. Additional cooling would cause the furnace fan to distribute combustion and roof air at less than the optimal temperature, which happens to be as hot as the fan can safely operate. The UCZ air has previously been modified to blow colder outside air up through the pellet bed. The result was cooler air distributed by the furnace fan. The change was immediately set back to the original configuration.

The humidification of the UCZ air is capable of cooling the pellets without negatively impacting the furnace fan's objective of delivering air as hot as the fan will safely deliver.

Most of the air heated by being forced up through the hot pellets in the UCZ is transferred to the area above the recuperation zone and again moved through the pellet bed. The increased specific heat of the air does have some marginal benefit before reaching the oxidation zone. Once the treated air passes through the oxidation zone the air has the capacity to transfer some additional heat to the pellets being prepared for oxidation. The humidified air that passes through the recuperation zone is forced through by the suction of the recuperation fan. The recuperation fan supplies the air used by the forced draft fan to start the drying and heating of the pellet bed. The hot (850° F.) humidified air transfers an increased amount of heat consistent with the additional 1% water vapor that is present. The recuperation fan and associated ductwork dilutes the 140 pounds of water per minute to about 90 pounds per minute. Additional leakage reduces the weight of water through the pellet bed to about 70 pounds per minute.

An example of typical moisture and heat transfer conditions will now be presented. Seventy pounds of water vapor will be used in this example. The specific heat of the 1.2% water vapor transfers heat relative to the difference of 0.1 for dry air to 0.13 for water vapor. Compared to summer conditions, the humidified air will have 2.4 times as much water vapor. Sensible heat transfer because of the humidified air will increase slightly. The 1.2% weight of water vapor may increase the heat content transfer by 1.4%. The heat transfer in winter is much greater. This improvement is significant, but there is another benefit of humidified air that is much greater.

The main benefit of humidified air is that the heat of vaporization is significantly higher than either summer or winter operation. Consider the humidified air provided by the present invention as having 0.007 pounds of water per pound of dried air. It takes 13.35 cubic feet of dry air to equal one pound. Using reasonable values, the UDZ air volume is about 133,500 standard cubic feet in volume or about 10,000 pounds of air. If the water vapor content is 0.01 pound of water vapor per pound of dry air, there is 100 pounds of water vapor per minute in the air stream. Because of leakage through associated ductwork, the final weight of water per minute is about 70 pounds per minute. The heat of vaporization is 970 BTUs per pound of water vapor times 70 pounds, or 67,900 BTUs per minute. That is a great deal of extra heat due to hot humidified air. Each BTU by definition is the quantity of heat required to raise one pound of water 1° F.

A furnace operating at 200 tons of pellets per hour is operating at 6,700 pounds per minute pellets. Since the pellets contain 10% water for a total of 670 pounds water per minute, 68,000 BTUs per minute are available with the 70 pounds of water vapor. The invention is easier to understand, if one assumes half of the BTUs for heating the pellets and the other half for raising the temperature of the contained water. Therefore, 44,000 BTUs will raise 6,700 pounds of pellets with a specific heat of 0.16 as follows: 6,700 pounds times 0.16 equals 1072 pounds of pellets with an equivalent specific heat of 1.0. Therefore, 44,000 BTUs divided by 1072 pounds equals a 41° F. increase in a one minute supply of pellets. This benefit does not result from any other heat input. Previously, pellets were heated without the additional water vapor. It was shown hereinabove that in a short time the center of a pellet would not absorb much heat (perhaps only 50% of a pellet's mass would be heated significantly). With this in mind, the 41° F. temperature increase can easily be doubled to 60° F., the temperature increase moving the surface temperature of all the pellets well above the dewpoint.

The remaining 34,000 BTUs are available to heat the water in and on the pellets. The water makes up 10% of the 6,700 pounds per minute pellets or 670 pounds of water with a specific heat of 1.0. Therefore, 44,000 BTUs will heat 670 pounds of water to a temperature increase of 50° F. Again, nearly 50% of the water will be in the center of the pellets. Consequently, it is estimated that the additional water vapor will raise the temperature of the available water to a temperature increase of 100° F. This temperature rise considers only the heat of vaporization of 70 pounds of water vapor. It should be noted that there is fairly good heat transfer without humidifying the UCZ air. This improvement, coupled with the enhanced jet drying, radiant heat reflectors and windbox 5 dampers, produces greater benefits.

The calculations used in this example assume a reasonable amount of humidification of the UCZ air. The value of 0.012 pounds water per pound of dry air is easily obtained for air with a dewpoint of 65° F. A high summertime dewpoint of 90° F. is common in many southern Gulf coast states. To obtain humidification of 65° F., the hot humid air from one dust collector may have to be supplemented by a second source of steam. Since the volume of air used for updraft cooling exceeds 160,000 scfm, 12,000 pounds of dry air times 0.010 pounds water per pound of dry air results in about 120 pounds water vapor. With the dilution factor, the amount of water forced upwardly through the bed of pellets results in about 70 pounds water vapor that was used in the updraft drying zone example.

It is recommended that tests using a small amount of water vapor such as in this example be used initially. More water vapor can be used later depending on how the furnace reacts to the added heating and drying obtained.

The following calculations consider the benefit of 0.012 pounds water per pound of dry air for a period of one minute. The cooling in the updraft cooling zone (UCZ) lowers the pellet temperature by about 40° F. Additional time, such as five or six minutes, would probably lower the temperature so that it is at least 50° F. cooler because of the limited heat transfer characteristics of pellets.

However, the calculations for the heat transfer in the updraft drying zone (UDZ) remain quite reasonable when the additional four minutes of air exposure is added to the dewpoint of 50° F. (at 0.007 pounds water per pound of dry air). The calculated value is reasonable because new green pellets are placed upon the pellet conveyor each minute. The temperature increase for both the outer half of the pellet mass and the outer half of the contained water both indicate a temperature increase of about 80° F. These calculations do not consider the sensible heat transfer from the dry air component of the updraft drying zone (UDZ) air. The dry air component will evaporate water from the surface of the pellet and also transfer heat to the pellets. Without the invention, only the dry air portion heating capability is available.

With 0.007 pounds of water per pound of dry air, it must be understood that the dry air component is 99.3% dry air with 0.7% water vapor. While the majority of the humid air consists of dry air, the water vapor contributes to the heat capacity of the air stream by the values that follow. First, 0.007 pounds water per pound of dry air is 0.7% of the weight due to water, but 4.4% of the heat capacity due to the heat of vaporization of water. By the same token, 0.01 pounds water per pound of dry air is 1.0% weight due to water vapor, but 6.5% of the heat capacity due to the heat of vaporization of water. In addition, 0.02 pounds water per pound of dry air is 2.0% of the weight due to water vapor, but over 12% of the heat capacity due to the heat of vaporization.

The previous calculations were made for the heat capacity due to the heat of vaporization of water vapor. Thus, the water vapor contributes heat due to sensible heat transfer. The sensible heat that the water vapor contributes equals the same percentage of heat (BTUs) as the percent of water vapor. Finally, sensible heat contribution due to water vapor is slightly greater than an equal percentage of dry air.

Thus, the temperature increase of the pellets and the contained water are useful in raising the temperature of the pellets significantly above the dewpoint. This will prevent water from condensing on the surface of the pellets. When coupled with air jets directing hot air down on the surface of the pellet bed, the net result will be pellets that are much drier when they enter the next zone of the furnace. In addition, the surface of the pellets will be smoother and therefore they will create less dust. Greater furnace efficiency will be the most outstanding advantage, but dust abatement is increasingly important for environmental purposes.

It should be recognized that to achieve the temperature benefit from the heat of vaporization, 70 pounds of water would have to condense onto the surface of the pellets when 0.007 pounds water per pound of dry air is used for drying pellets. This is not a problem because there is so much additional heat available.

In accordance with the present invention, hot moist air is obtained from dust collectors with water being used as the dust collecting medium. Preferably, to obtain moist air in accordance with the invention, water is sprayed on the hot pellets discharged from the end of the furnace by means of one or more sprayers 256 which receive water from control valve 258 (FIG. 17). Hot air and steam from spraying water on the hot pellets provides a source for hot humid air. The equipment described provides economical hot humid air without requiring drastic changes to the physical operating equipment in pelletizing plants now in operation. A dust collector 259 is of the water bath type. Hot air and steam heat the water bath to about 125° F. Air leaving the dust collector 259 has a dewpoint of about 125° F., or 0.095 pounds of water per pound of dry air.

One preferred arrangement according to the present invention provides about 15,000 acfm to be directed by ductwork to the intake of an updraft cooling fan 260. To provide this volume, one dust collector (and sometimes two dust collectors) can be an economical source of hot humid air. Two collectors may provide some, if not all, of the volume of hot humid air that I estimate will be required. The hot humid air from the dust collectors will be at a temperature and dewpoint higher than calculated for the total in the UCZ air. Therefore, the optional 70 pounds of water vapor may be approached. Tests can, however, be conducted at less than the optimum weight of water vapor to evaluate the benefits. The hot humid air from even one commercial dust collector would probably be an adequate volume of hot humid air to provide the heat of vaporization (heat content) to warm the pellets enough to show advantages such as less dust and reduced magnetite cores and less cracked pellets caused by inadequate pellet drying on the top of the pellet bed.

Another source of hot humid air in accordance with the invention is from steam generated by piping water either through some of the hot ductwork 264 connecting recuperation windboxes at 250 to the main recuperation duct 262. Generally, the transition ductwork is called downcomers shown at 264 in FIG. 17. If this source is used, pipes 235 installed inside the downcomers 264 or attached around the downcomers conduct enough heat to generate steam which is conveyed by duct 237 to a collection hood 267. The volume of steam generated is related to the engineering method utilized. More steam is used for a greater effect. The steam can be discharged near the intake for the updraft cooling fan. These two sources of humid air will provide adequate water vapor to provide the benefit of slightly increased cooling of the fired pellets and more importantly vastly improve the heating and drying of the green pellets in the updraft drying zone.

Green pellets in the updraft drying zone will be wet from condensation for much less time using hot humid air than with the air that has no added moisture. The reduced time that a green fluxed pellet is exposed to condensed water vapor in accordance with the invention reduces the roughness and coarseness of the outside of the fired pellets. This is important because the smooth pellets that are produced generate less dust.

An important advantage of the invention is that it transfers some of the waste heat (energy) into hot humid air. The hot humid air can be heated to a much higher temperature and economically transferred to the part of the pellet bed that will benefit most from the additional heat. It is proposed that the pellets on the top six inches of the pellet bed will be warmed (with most of the contained water) at least 65° F. warmer by the additional heat content of the hot, humid air. While various sources of hot humid air have been described, any available source such as a steam generator can be used.

Using the water vapor from the dust collectors can be accomplished by discharging some of the steam and hot humid air that is generated inside the plant to the UCZ rather than discharging the air and water vapor outside the plant. Any air discharged outside the plant, particularly in the winter, must be replaced. The replacement air is cold and very dry. The replacement air enters the building by coming through any leaks that may exist. The process is called infiltration. The inside of most processing plants has an atmospheric pressure somewhat less than the atmospheric pressure outside the building. When one considers a general pelletizing plant discharging hundreds of thousands of cubic feet per minute air and other gasses, it will be realized that the same volume of replacement air must infiltrate back inside the enclosed plant. The plants are always enclosed during the cold winter months. The present invention reduces the volume of air discharged on the order of about 20,000 cubic feet per minute, a very significant reduction.

Many variations of the present invention within the scope of the appended claims will be apparent to those skilled in the art once the principles described herein are understood.

What is claimed is:

1. A method of drying iron ore pellets in a furnace comprising the steps of:
    forming moisture-containing pellets into a bed comprising a multiplicity of the pellets, said bed having an upper and a lower surface,
    forcing a current of drying gas through the bed of pellets,
    providing at least one heat recuperation zone following the exposure of the bed to the drying gas,
    placing heat reflector means within the furnace over the bed of pellets in the heat recuperation zone for reflecting heat from the pellets back onto the pellets to thereby reduce the heat lost from the bed within said heat recuperation zone.

2. The method of claim 1 wherein hot moist air is directed onto the top of the pellet bed within the heat recuperation zone.

3. The method of claim 2 wherein the hot moist air is directed adjacent the reflector means onto the bed of pellets.

4. The method of claim 1 including providing a wall above the bed at an inlet of the recuperation zone and directing air onto the bed proximate the wall for supplying oxygen to enhance the quality of the pellets in the bed.

5. The method of claim 4 wherein the wall is a firebrick wall.

6. The method of claim 1 including placing a plurality of said reflectors in the furnace above the bed, placing the reflectors along a line extending longitudinally of the furnace, and forcing air onto the pellet bed between the reflectors.

7. A method of drying iron ore pellets in a furnace comprising the steps of:
    forming moisture-containing pellets into a bed comprising a multiplicity of the pellets, said bed having an upper and a lower surface,
    forcing a current of drying air upwardly through the lower surface of the bed of pellets in an updraft drying zone,
    providing a plurality of windboxes in the updraft drying zone that force air upwardly through the bed of pellets one after another, and
    providing a means for stopping or reducing the flow of air to a selected one of the windboxes responsive to the presence of a blow hole in the bed.

8. The process of claim 7 wherein the bed of pellets is advanced past each of the windboxes in succession and the selected windbox is the last windbox in the updraft drying zone.

9. The method of claim 7 including sensing the presence of a blow hole by detecting dust in the furnace and stopping or reducing said flow of air responsive to the detection of the dust.

10. A method of drying iron ore pellets in a furnace comprising the steps of:
    forming moisture-containing pellets into a bed comprising a multiplicity of the pellets, said bed having an upper and a lower surface,
    forcing a current of drying gas through the bed of pellets,
    advancing the bed of pellets through the furnace,
    providing a cooling zone within the furnace following a zone of higher heat,
    applying water to the pellets after the pellets are advanced through the furnace to produce steam or water vapor, and
    collecting and applying the steam or water vapor thus produced to the bed of pellets within the furnace.

11. The method of claim 10 including mixing the steam or water vapor thus produced with a stream of air to provide a stream of hot humid air, and directing said stream of hot humid air toward the pellets in the bed to provide greater heat transfer capacity for said stream of air directed toward the pellet bed.

12. The method of claim 11 wherein the stream of hot humid air is passed through the pellet bed in a cooling zone.

13. The method of claim 11 wherein the stream of hot humid air is passed through the pellet bed to provide updraft cooling by forcing a current of humid air up through the pellets in an updraft cooling zone to improve the cooling of the pellets and also recover waste heat.

14. The method of claim 11 wherein the stream of hot humid air is passed through the pellet bed in an updraft zone.

15. The method of claim 10 including mixing the steam or water vapor thus produced with a stream of air to provide a stream of hot humid air, and forcing said stream of hot humid air through the pellets in the bed in an updraft drying zone of the furnace to provide greater heat transfer capacity to the air forced through the pellet bed.

16. A method of drying iron ore pellets in a furnace comprising the steps of:
    forming moisture-containing pellets into a bed comprising a multiplicity of the pellets, said bed having an upper and a lower surface,
    forcing a current of drying gas through the bed of pellets,
    advancing the bed of pellets through the furnace,
    applying water to the pellets after the pellets have been heated in the furnace to produce steam or water vapor,
    collecting and supplying the steam or water vapor thus produced to the bed of pellets by using the steam and/or water vapor to produce a hot humid air stream, and
    passing the hot humid air stream upwardly through the pellet bed in an updraft drying zone of the furnace.

17. A method of drying iron ore pellets in a furnace comprising the steps of:
    forming moisture-containing pellets into a bed comprising a multiplicity of the pellets, said bed having an upper and a lower surface,
    forcing a current of drying gas through the bed of pellets,
    advancing the bed of pellets through the furnace,
    applying water to the pellets after the pellets are advanced through the furnace to produce steam or water vapor,
    collecting and applying the steam or water vapor thus produced to the bed of pellets to thereby add moisture to the pellet bed by providing a current of hot humid air wherein the specific heat thereof has been elevated, and
    supplying said current of hot humid air to the bed of pellets in a cooling zone to enhance heat transfer therein.

18. The method claim 17 wherein the current of hot humid air is passed upwardly through the bed in said cooling zone.

19. An apparatus for drying iron ore pellets comprising,
    a support for moisture-containing pellets as a bed comprising a multiplicity of the pellets, said bed having an upper and a lower surface,
    an air mover to transfer a current of drying gas upwardly through the lower surface of the bed of pellets,
    a heat reflector is mounted above the bed within the furnace, such that the heat from the bed is reflected by the reflector back onto a portion of the bed below the heat reflector.

20. The apparatus of claim 19 wherein a current of hot air is directed onto the bed below the heat reflector.

21. The apparatus of claim 20 wherein the air is directed onto the bed by a fan.

22. The apparatus of claim 20 wherein the air is directed onto the bed by an air ejector.

23. The apparatus of claim 19 including an air mover for forcing through the bed a stream of hot air to which moisture has been added.

24. The apparatus of claim 23 wherein the air stream is forced upwardly through the bed.

25. The apparatus of claim 19 wherein the heat reflector is formed from a layer of a reflective ceramic material.

26. The apparatus of claim 19 wherein a downstream end of the reflector is angled upwardly on an oblique incline.

27. The apparatus of claim 19 wherein a plurality of the reflectors are provided in a line extending longitudinally of the furnace with ends thereof overlapped.

* * * * *

UNITED STATES PATENT AND TRADEMARK OFFICE
CERTIFICATE OF CORRECTION

PATENT NO.     : 6,226,891 B1                                   Page 1 of 1
DATED          : May 8, 2001
INVENTOR(S)    : Daniel R. Chapman It is certified that error appears in the above-identified patent and that said Letters Patent is hereby corrected as shown below:

Title page,
ABSTRACT,
Line 6, after "reflectors" insert -- are placed --.
Line 6, after "bed" insert -- to --.
Line 9, after "reflectors" cancel "are placed" and after "bed" cancel "to".
Line 10, after "wall" insert -- located --.

Signed and Sealed this

First Day of January, 2002

*Attest:*

JAMES E. ROGAN
*Attesting Officer*                *Director of the United States Patent and Trademark Office*